United States Patent
Moorman et al.

[11] 3,807,035
[45] Apr. 30, 1974

[54] METHOD OF AND APPARATUS FOR PRECISION POSITIONING OF HEAVY WORKPIECES

[75] Inventors: Newton G. Moorman, Rockford; Denis Langoussis, Rockton, both of Ill.

[73] Assignee: The Ingersoll Milling Machine Company, Rockford, Ill.

[22] Filed: May 8, 1972

[21] Appl. No.: 251,444

[52] U.S. Cl. ............ 29/563, 180/125, 29/33 P, 108/51, 408/76, 51/235
[51] Int. Cl. .............. B23q 7/00, B65d 19/00
[58] Field of Search ......... 29/33 P, 563; 108/51, 62; 408/76; 51/235; 180/119, 125

[56] References Cited
UNITED STATES PATENTS

| | | | |
|---|---|---|---|
| 3,376,764 | 4/1968 | Schardt | 51/235 X |
| 3,253,665 | 5/1966 | Schienle | 408/76 X |
| 3,276,530 | 10/1966 | Borneman | 108/51 X |
| 3,124,209 | 3/1964 | Flipse | 180/125 X |
| 3,202,232 | 8/1965 | Rogers | 180/119 |
| 3,592,285 | 7/1971 | Noble | 180/119 X |

OTHER PUBLICATIONS

Ashmead, G. B., Let Air do the Work in Mechanix Illustrated, p. 42 and 43, Mar. 23, 1962.

Primary Examiner—Andrew R. Juhasz
Assistant Examiner—Z. R. Bilinsky
Attorney, Agent, or Firm—Wolfe, Hubbard, Leydig, Voit & Osann, Ltd.

[57] ABSTRACT

At a loading station, a large heavy workpiece such as a turbine housing is anchored in a predetermined position on an underlying pallet which then is propelled and steered across the shop floor to a machining station while supported and floated vertically on a cushion of pressurized air. The pallet then is located accurately in all three dimensions in the machining station to enable precision machining of the workpiece while the latter is supported on the pallet.

24 Claims, 24 Drawing Figures

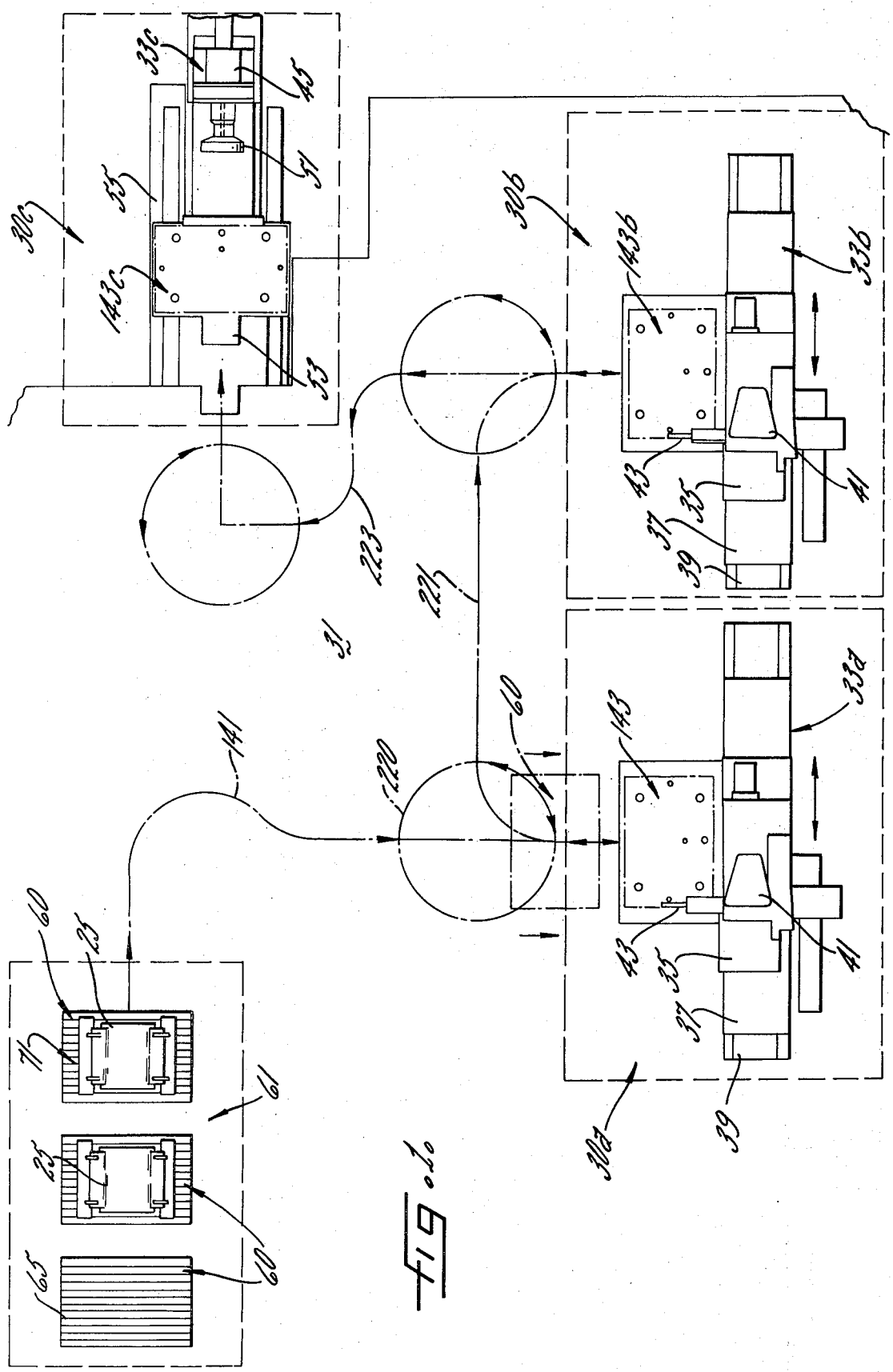

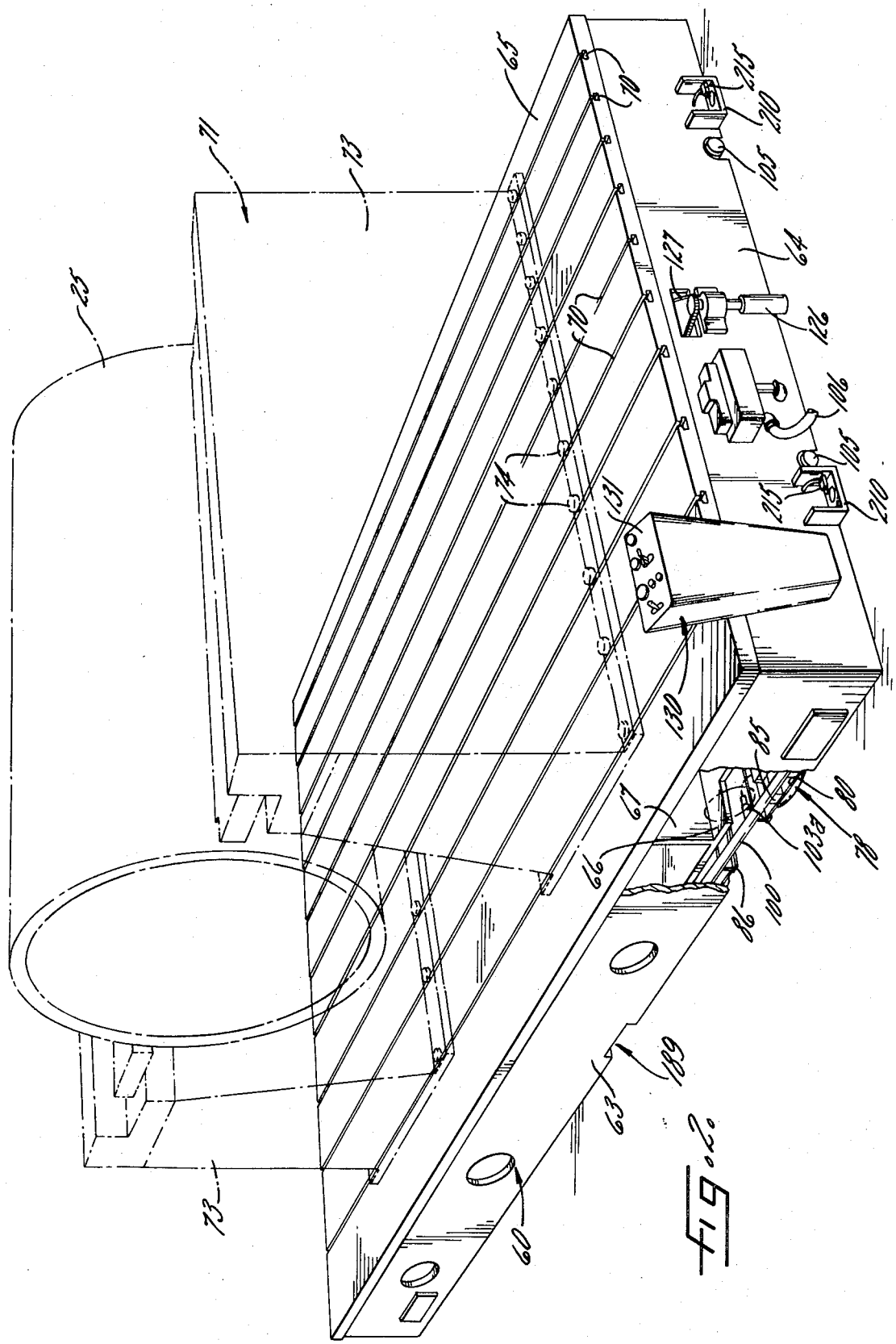

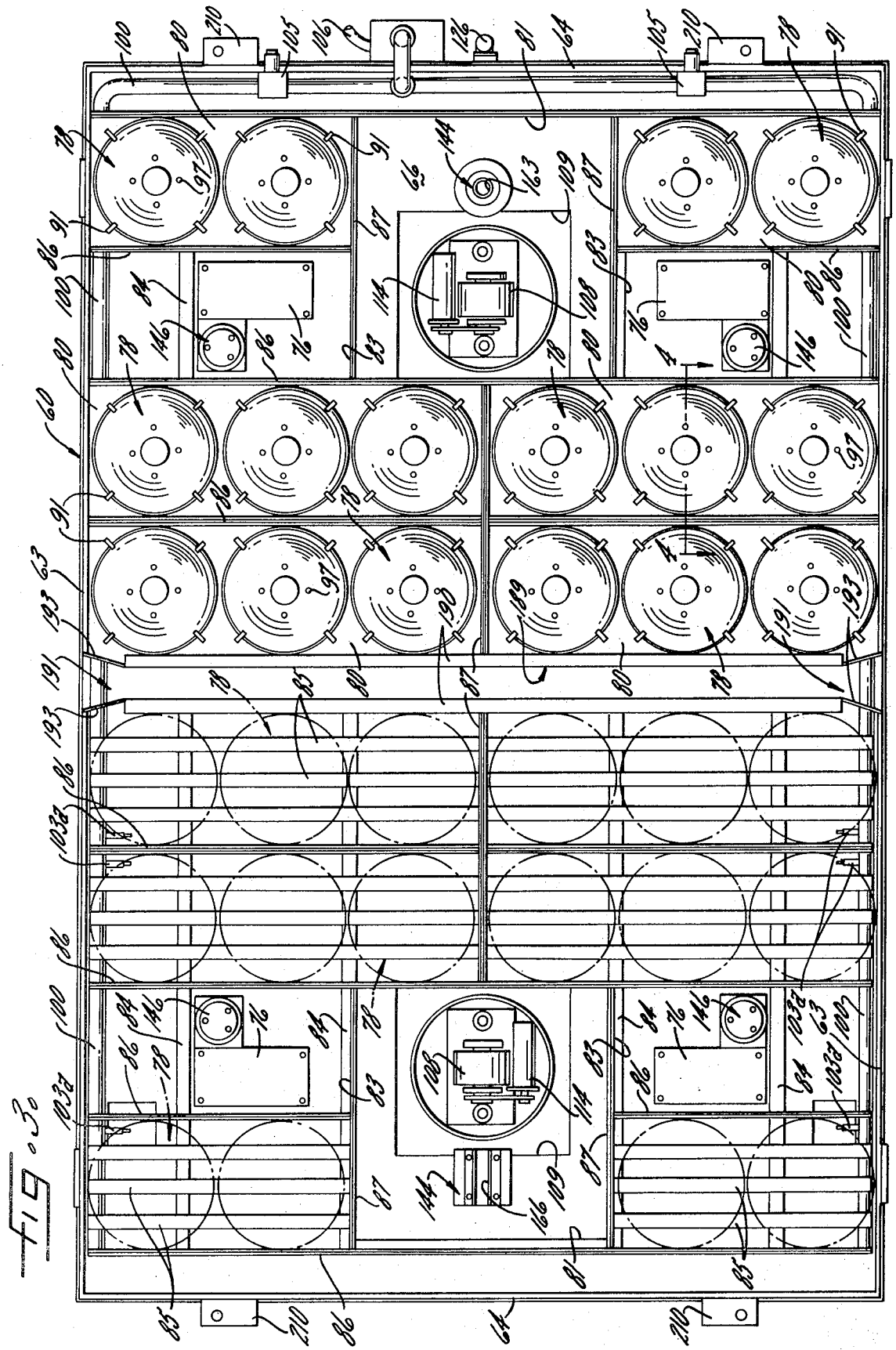

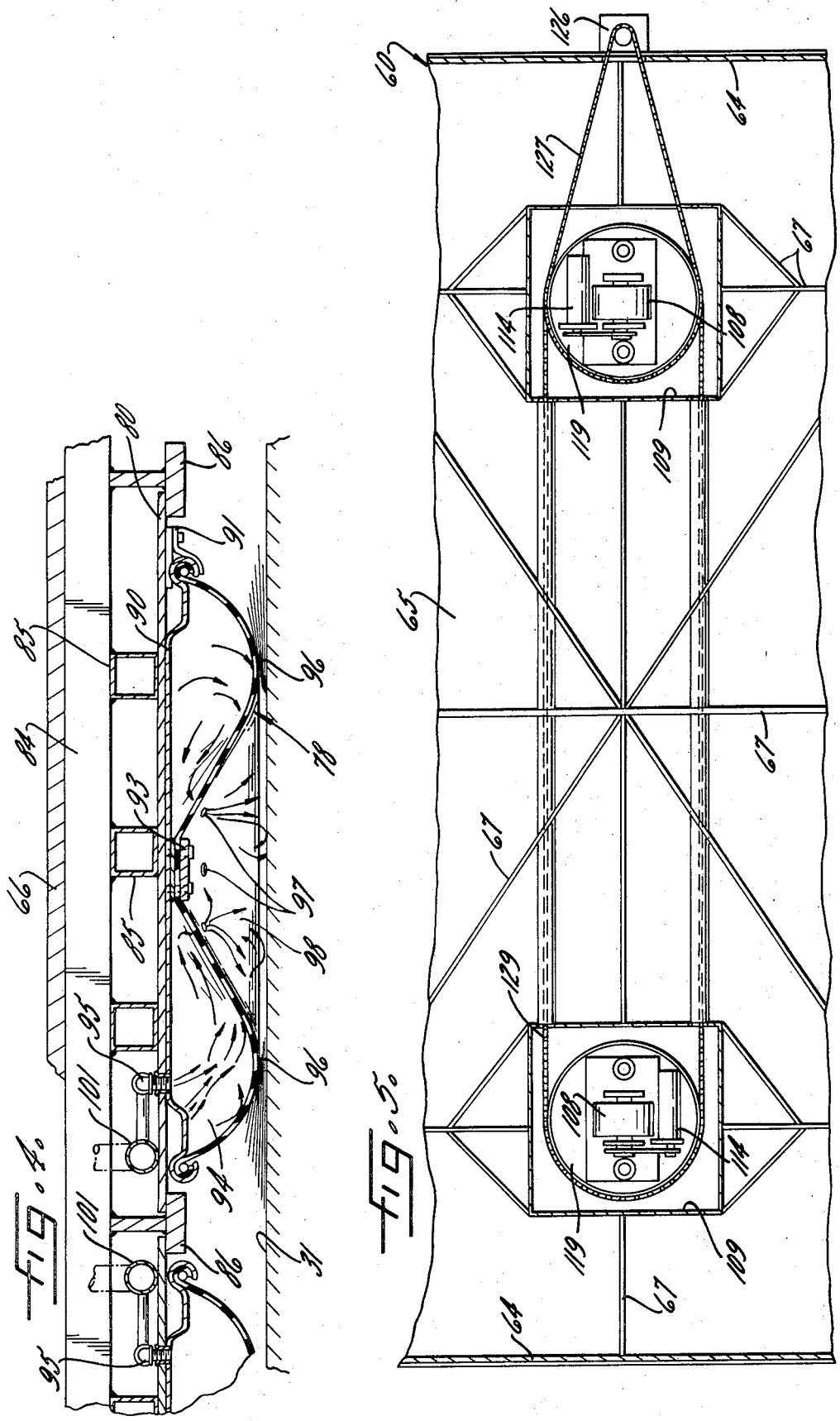

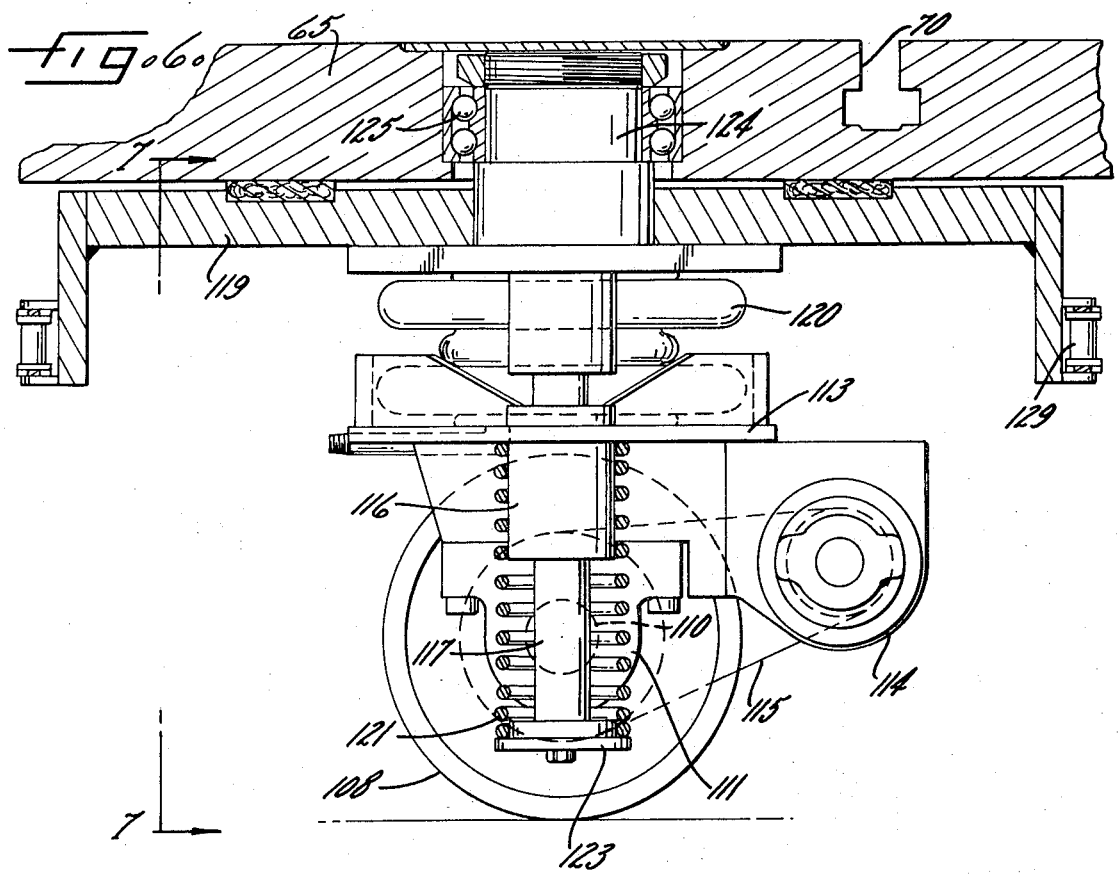
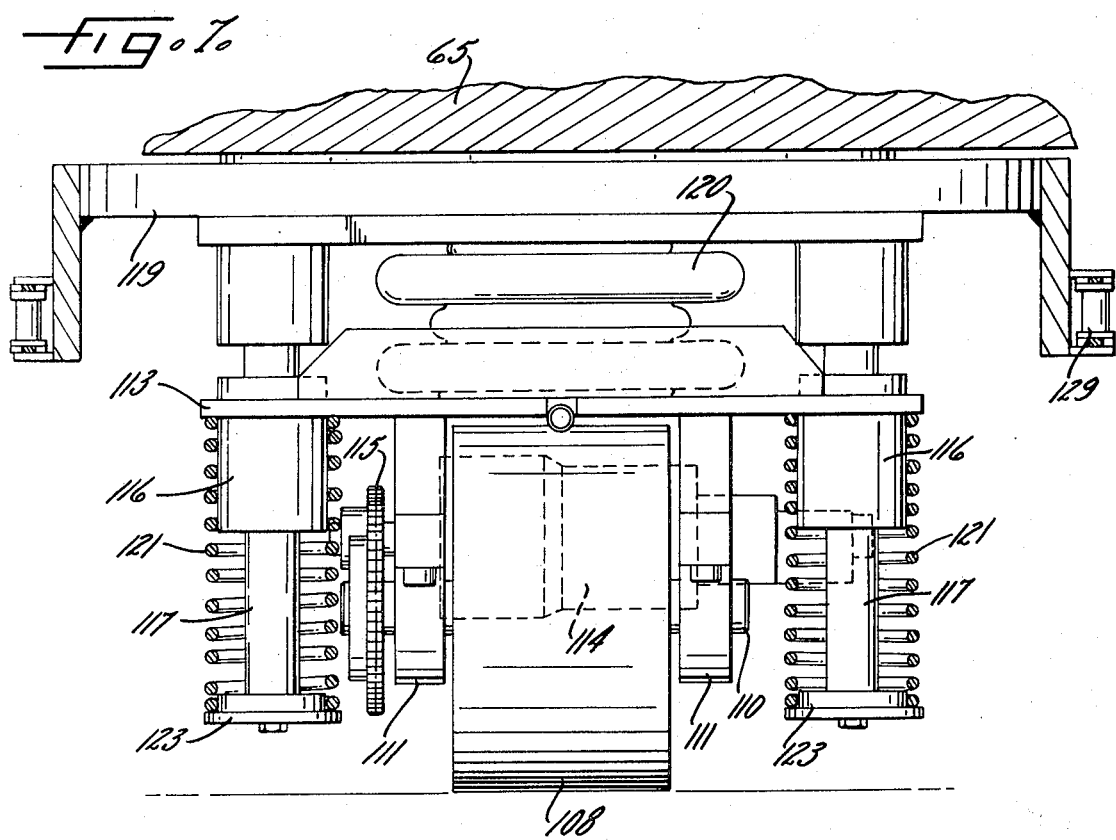

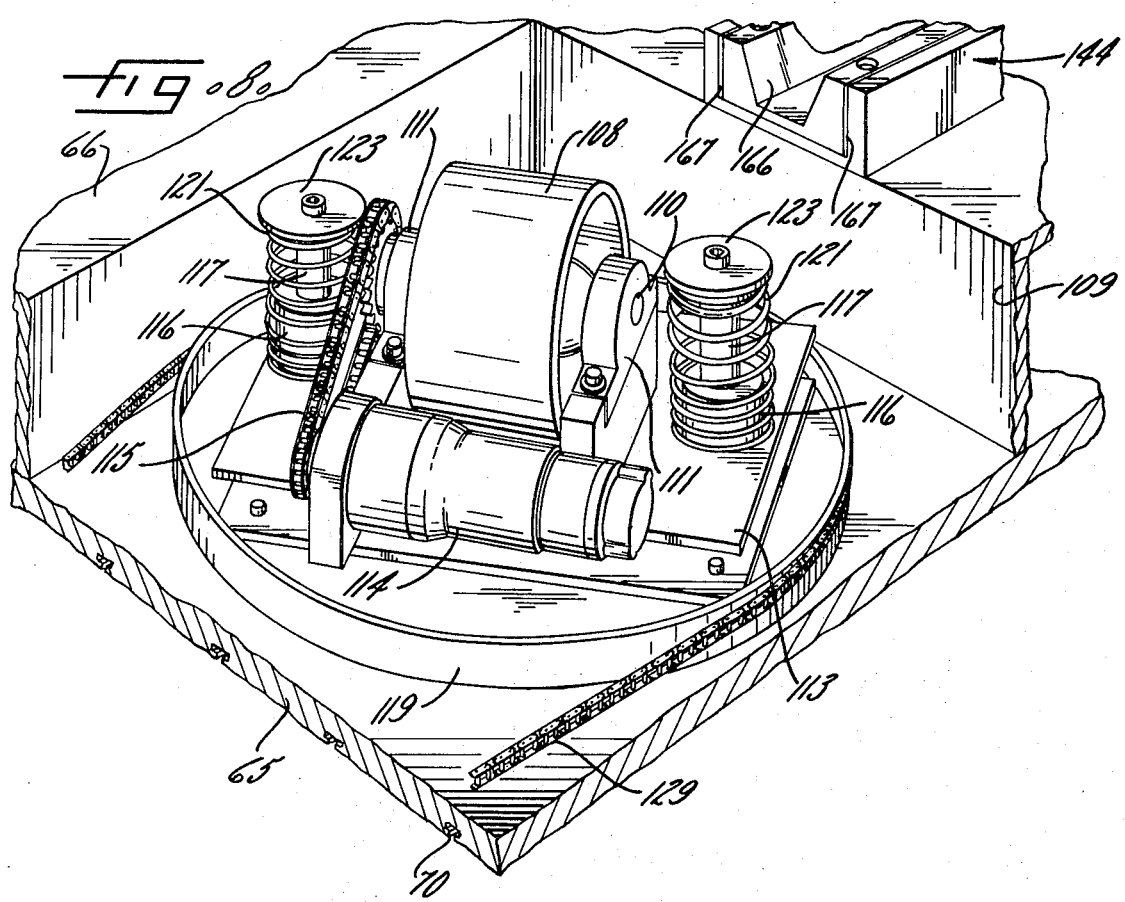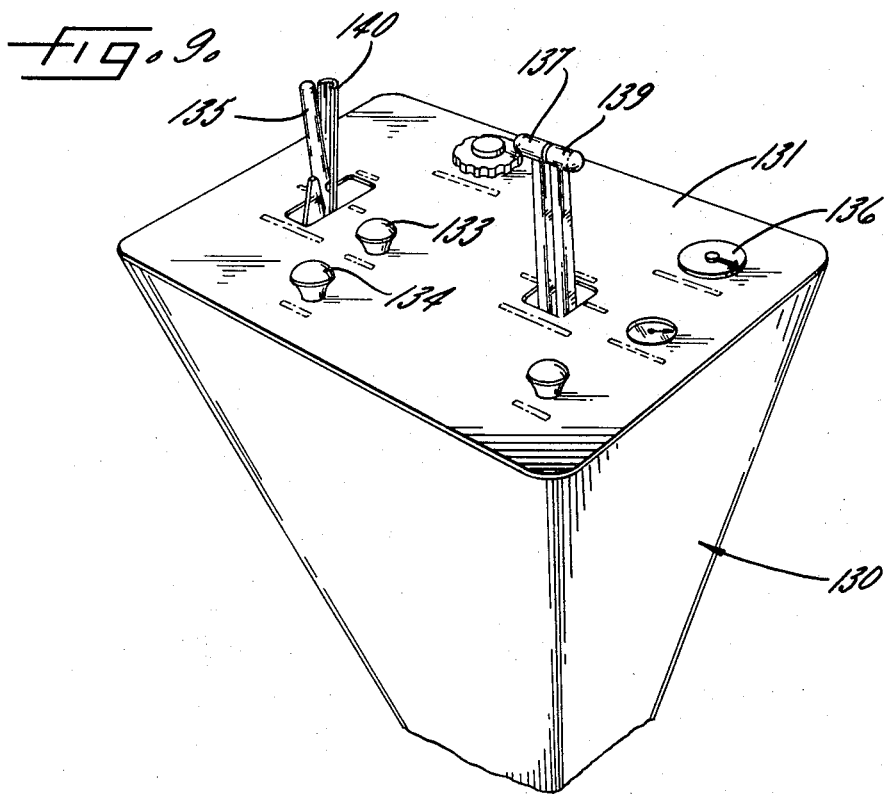

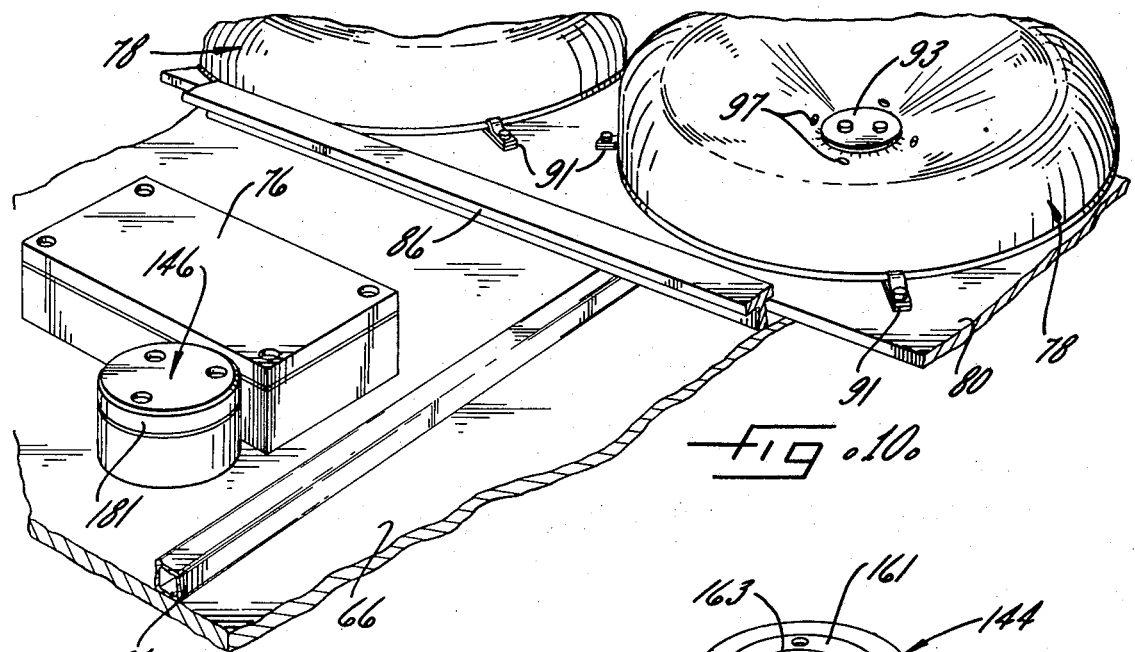
Fig. 10.
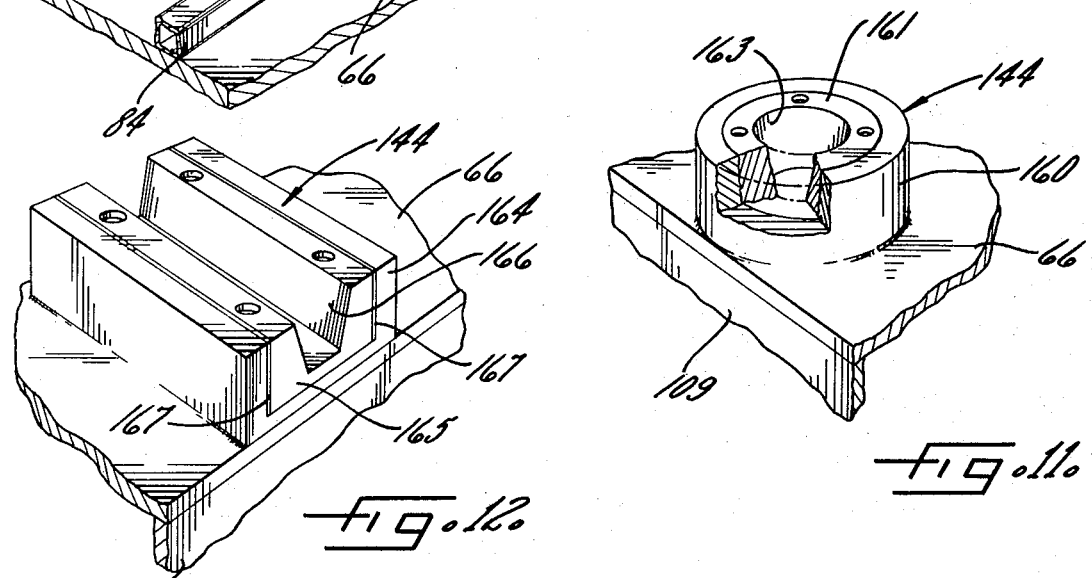
Fig. 12.
Fig. 11.
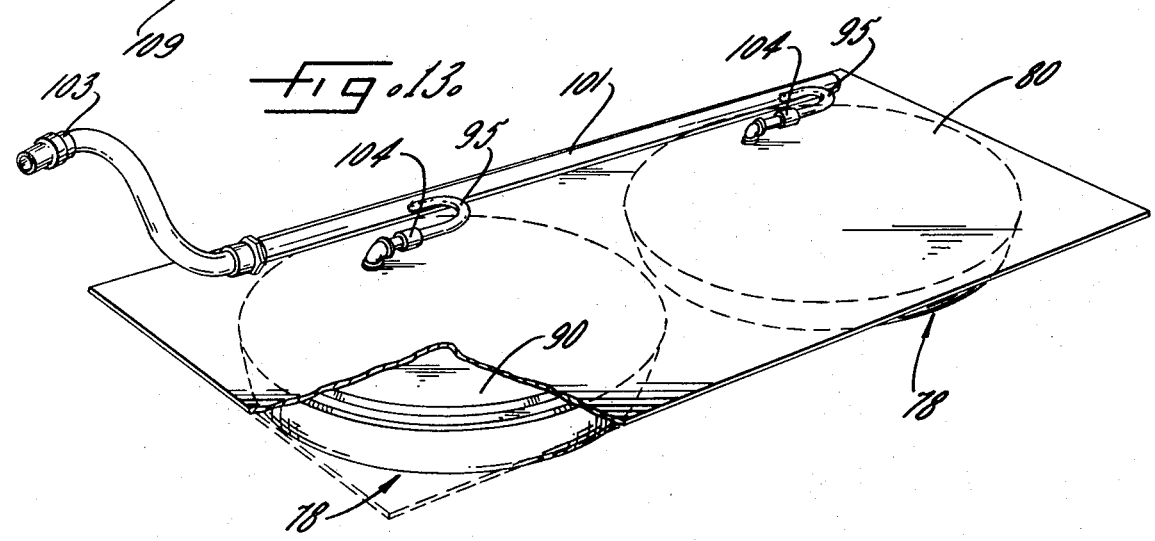
Fig. 13.

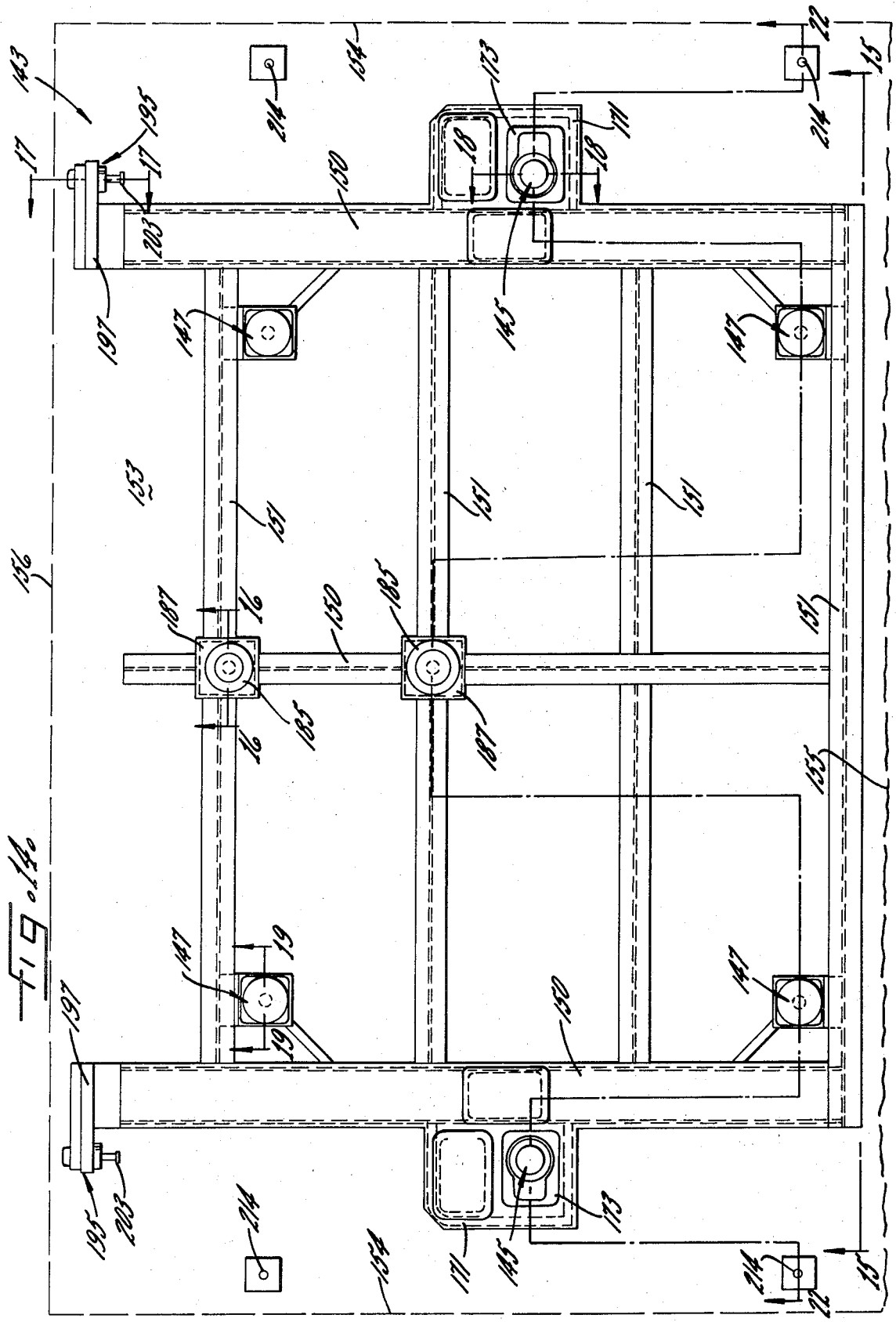

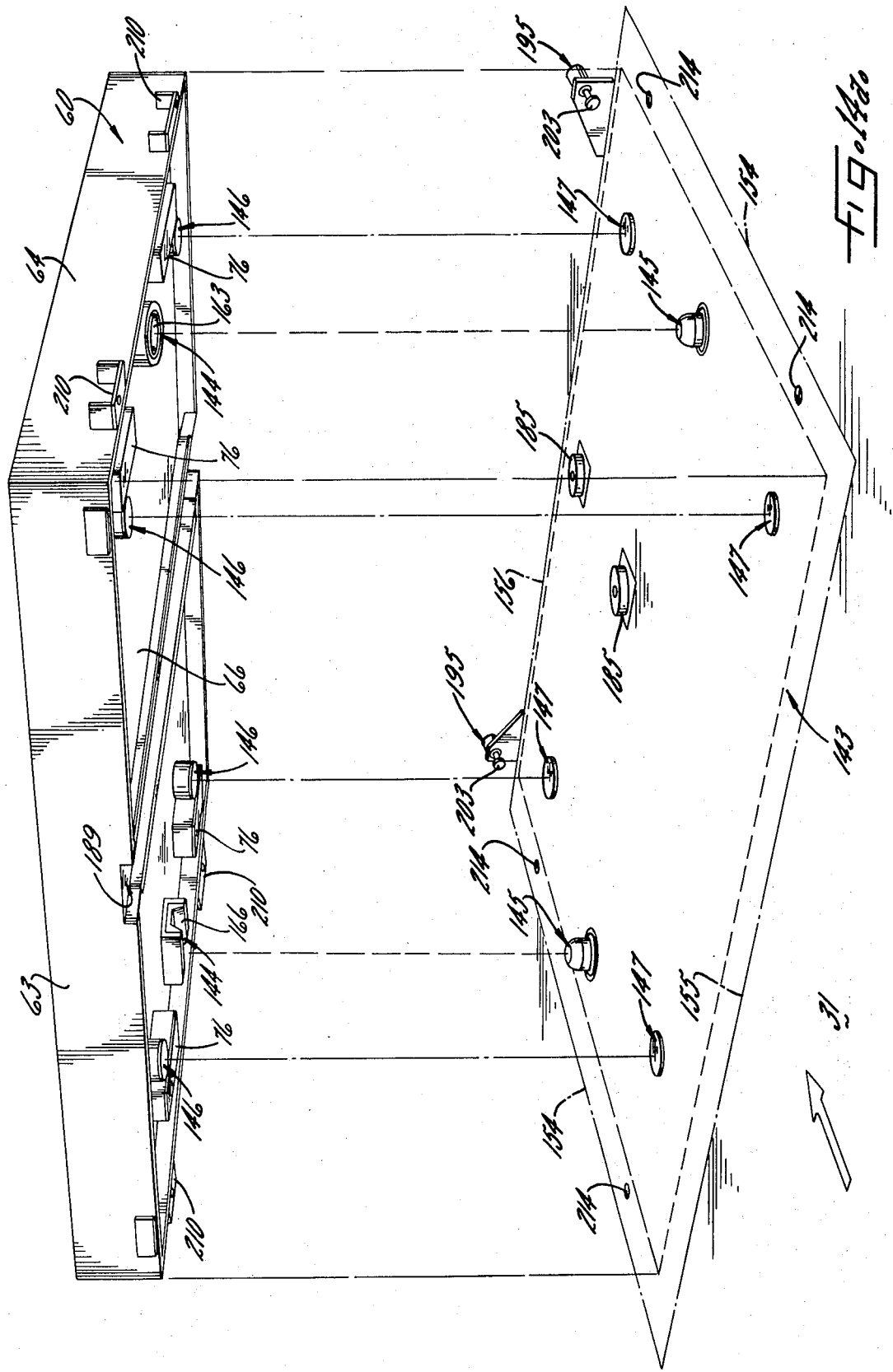

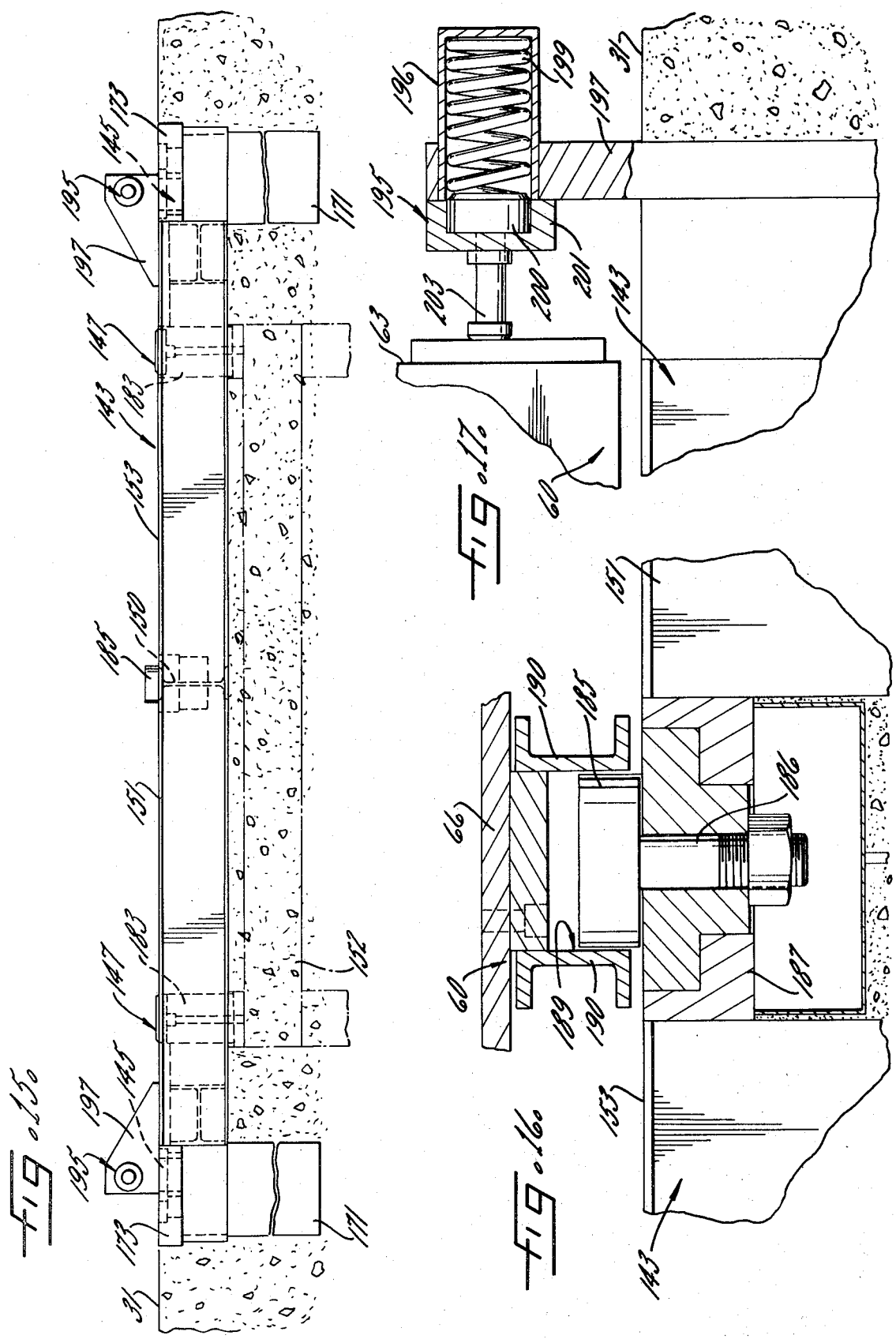

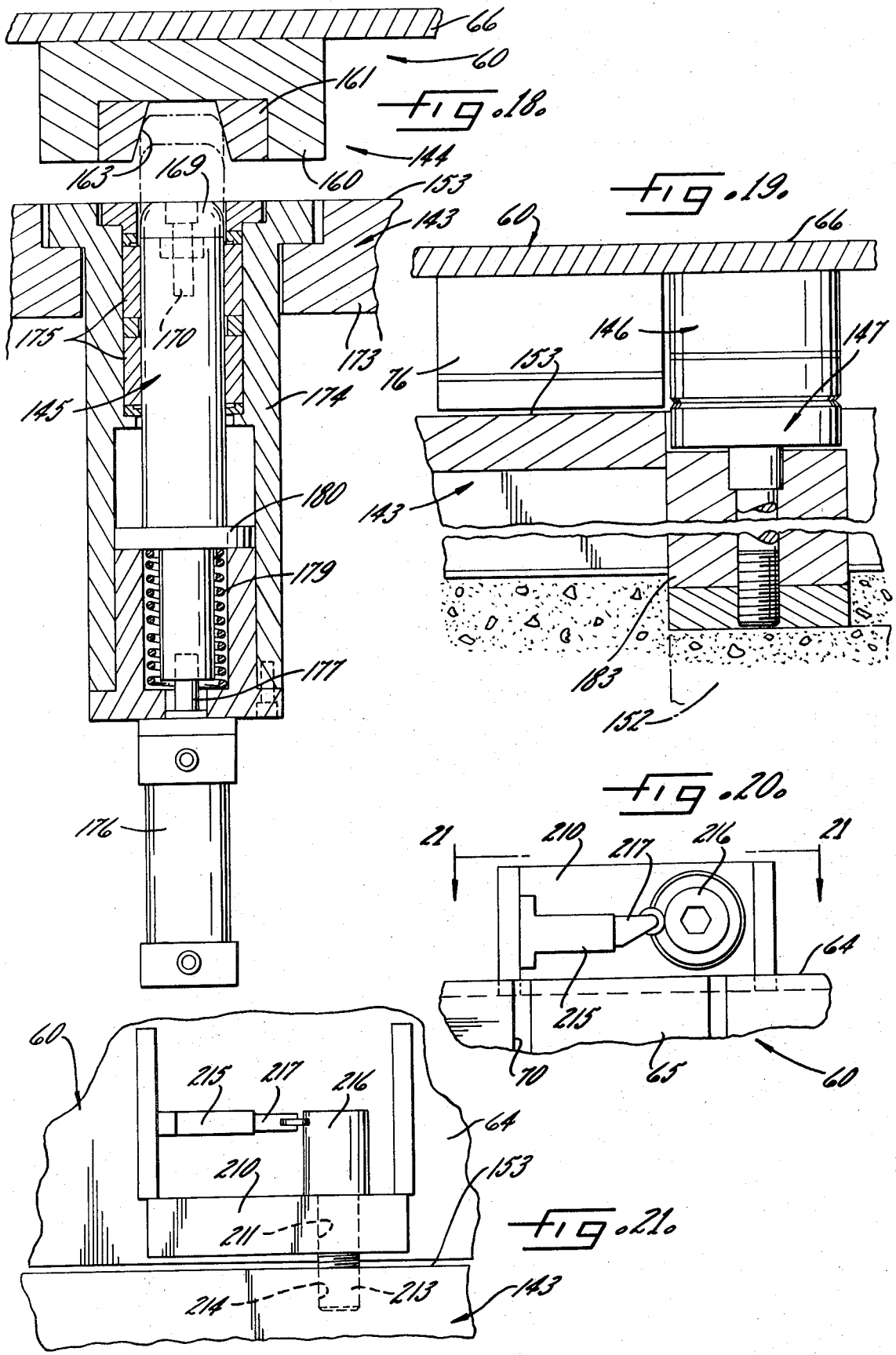

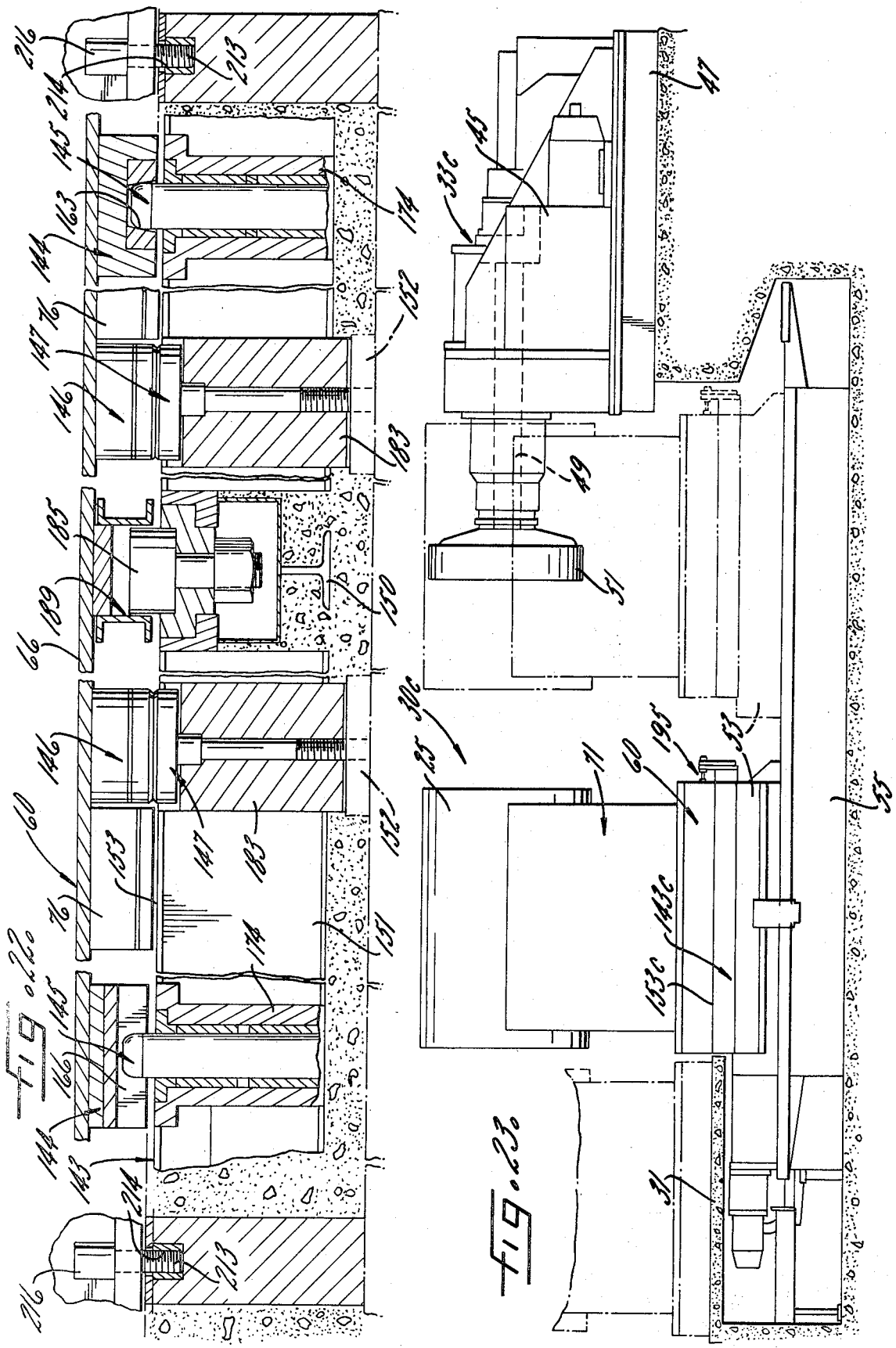

METHOD OF AND APPARATUS FOR PRECISION POSITIONING OF HEAVY WORKPIECES

BACKGROUND OF THE INVENTION

The present invention relates to the handling of heavy workpieces such as, for example, the housings of large turbines and to the location thereof adjacent a tool or the like preparatory to performing a machining operation requiring precision positioning of the piece. Heretofore, large workpieces of this type usually have been lifted by an overhead crane, deposited onto a work table and shifted thereby to the position required for the machining.

Smaller workpieces which are likely to be deformed by clamping or machining forces are sometimes secured to individual plates or so-called pallets which are slid step-by-step along a guideway and doweled into fixtures at stations where the pieces are machined. A system of this type is shown in U.S. Pat. No. 2,392,169.

Heavy loads of steel or the like are frequently placed on a large rigid transporter which may be moved easily across the shop floor to the desired location after first being lifted a short distance above the floor by a cushion of compressed air. Equipment for forming such an air cushion and propelling the transporter and its load across a shop floor is manufactured by Rollair Systems, Inc. of Santa Barbara, Calif. whose Bulletin No. 1,070 discloses exemplary transporters of this type.

SUMMARY OF THE INVENTION

The present invention combines the palletizing and air cushioning techniques above described and utilizes the same in unique ways in lifting and floatingly supporting extremely heavy workpieces above a shop floor, transporting the piece across the floor to a machining station, and locating the pallet (and thus the supported workpiece) in the machining station with great accuracy preparatory to performing a precision machining operation on an exposed area of the workpiece.

Generally stated, the improved method involves first the anchoring of each heavy workpiece in a predetermined location on an extremely rigid pallet in a set-up area or loading station on a smooth shop floor or other rigid surface. Secondly, the loaded pallet is raised a short distance by forming a cushion of compressed air between the pallet and the floor across which the floating pallet is propelled and steered along a random path into the machining station. In entering the latter, the floating pallet is guided along a fixed horizontal path and against a stop so as to be located in two transverse horizontal directions and approximately in its final machining position.

Final and precise horizontal location of the pallet and its supported workpiece is effected by dowels or the like projected into engagement with the pallet while the latter is still floating on the air cushion. To locate the workpiece in the third dimension, that is, vertically, it is only necessary to release the air pressure forming the cushion so as to permit lowering of the pallet until abutments thereon engage alined landing pads facing upwardly from the floor in the machining station.

With the foregoing method of palletizing and precise positioning through the use of the air cushion which may be activated and released at will, it is possible without the addition of further equipment to provide for easy indexing of the workpiece to present different areas thereof for machining. This is accomplished simply by again floating the pallet on air, backing it away from the tool, turning the floating pallet about an upright axis, and relocating the pallet in three dimensions in the manner described above.

The invention also resides in the novel arrangement of parts for guiding the floating pallet approximately into its final and precise position, and in the means for effecting final horizontal positioning of the pallet while permitting subsequent vertical positioning.

A further objective of the invention is to correlate the spacing between the vertical locating abutments and the landing pads to permit the abutments to rest on the pads in the machining station while keeping the abutments out of contact with the shop floor when the pallet is out of the machining station and the air cushion is released.

These and other objects and advantages of the invention will become more apparent from the following detailed description when taken in conjuction with the accompanying drawings.

BRIEF DESCRIPTION OF THE DRAWINGS

FIG. 1 is a schematic plan view of an exemplary shop floor which includes several machining stations and across which the pallet of the present invention is moved.

FIG. 2 is a perspective view of a new and improved pallet embodying the novel features of the present invention.

FIG. 3 is a plan view of the bottom of the pallet shown in FIG. 2. In this view, air bags for creating the air cushion have been shown in full lines on one half of the pallet but, for purposes of clarity, have been removed from the other half of the pallet and shown in phantom lines.

FIG. 4 is an enlarged fragmentary cross-section taken substantially along the line 4—4 of FIG. 3 and showing an inflated air bag somewhat schematically.

FIG. 5 is a fragmentary bottom plan view of the pallet, with parts broken away, and showing mechanism for steering friction wheels which propel the pallet across the shop floor.

FIG. 6 is an enlarged elevational view of one of the friction wheels illustrated in FIG. 5, parts being broken away and shown in section.

FIG. 7 is a view taken substantially along the line 7—7 of FIG. 6.

FIG. 8 is a fragmentary perspective view of one of the friction wheels and the underside of the pallet.

FIG. 9 is a perspective view of an exemplary console from which the pallet may be controlled.

FIG. 10 is a fragmentary perspective view showing the air bags and showing one of the vertical locating abutments on the pallet.

FIGS. 11 and 12 are fragmentary perspective views of members which are mounted on the underside of the pallet and which are used to locate the pallet horizontally.

FIG. 13 is a perspective view showing the upper side of a tray upon which a group of air bags are carried.

FIG. 14 is a plan view of an exemplary pallet base upon which the pallet is located when in the machining station.

FIG. 14A is an exploded perspective view showing the pallet base and the underside of the pallet and schematically showing the relation of the pallet to the base when the pallet is in the machining station.

FIG. 15 is an enlarged fragmentary cross-section taken substantially along the line 15—15 of FIG. 14.

FIGS. 16, 17, 18 and 19 are enlarged fragmentary cross-sections taken substantially along the lines 16—16, 17—17, 18—18 and 19—19, respectively, of FIG. 14 and further showing parts of the pallet located over the pallet base.

FIG. 20 is a fragmentary plan view showing parts for anchoring the pallet to the pallet base.

FIG. 21 is an elevational view taken along the line 21—21 of FIG. 20.

FIG. 22 is an enlarged fragmentary cross-section taken substantially along the line 22—22 of FIG. 14 and further showing parts of the pallet located over the pallet base.

FIG. 23 is a schematic side elevation of a machine tool located in one of the machining stations shown in FIG. 1.

DETAILED DESCRIPTION

The present invention is shown in the drawings as embodied in a machine tool organization in which different machining operations may be performed on large heavy workpieces 25 (FIGS. 1 and 2) at several machining stations 30a, 30b and 30c spaced from one another on the floor 31 of a machine shop. In this particular instance, each workpiece is a large turbine housing weighing approximately 80,000 pounds and having a diameter and length of several feet.

It will be appreciated that the machine tool organization may include any number of machine tools of different types and positioned in various arrangements on the shop floor 31 depending upon the nature of the workpiece 25 and the nature of the machining operations to be performed thereon. For simplicity, only three machine tools have been shown in the drawings and have been illustrated only schematically, there being combination milling, drilling and boring machines 33a and 33b (FIG. 1) located at the machining stations 30a and 30b, respectively, and there being a stub boring machine 33c located at the machining station 30c. Each of the machines 33a and 33b comprises a vertical column 35 mounted on a horizontally movable slide 37 which is adapted to be shifted back and forth on a fixed bed 39. A tool head 41 is movable up and down on the column 35 and carries a rotatable spindle 43 upon which is mounted a tool (not shown) for machining the workpiece when the latter is located in a stationary position in front of the machine.

The stub boring machine 33c (FIGS. 1 and 23) located in the machining station 30c is used to bore the internal surfaces of the workpiece 25 and comprises a head 45 mounted on a base 47. A rotatable spindle 49 (FIG. 23) is journaled in the head and carries a boring attachment 51 which supports a number of boring cutters (not shown). During boring of the workpiece, the latter is supported in a precise position on a slide 53 movable back and forth on an underlying bed 55 and capable of shifting the workpiece axially toward the spindle 49, first at a rapid traverse rate and then at a slower feed rate to effect machining of the workpiece.

In accordance with the present invention, transportation of the large and heavy workpiece 25 to and extremely accurate location of the workpiece in the machining stations 30 are simplified significantly (a) by rigidly fixturing the workpiece to the top of a large pallet 60 (FIG. 2) in a set-up area or loading station 61 (FIG. 1) on the floor 31 of the machine shop, (b) by lifting the loaded pallet from the floor with a cushion of compressed air and propelling and steering the pallet along a random path to one of the machining stations while supporting the pallet on the air cushion, and (c) by locating the pallet very accurately and rigidly in the machining station in a unique manner to place the workpiece in a precisely accurate final position for performance of the machining operation by the appropriate machine tool 33, the machining being carried out on the workpiece while the latter is still supported on the pallet. Upon completion of the machining operation, the pallet and the attached workpiece may be backed out of the machining station, indexed about an upright axis while supported on the air cushion, and then re-located quickly, easily and accurately in the same machining station to enable machining of a different exposed area of the workpiece. Subsequently, the pallet may be moved into the other machining stations for the performance of additional machining operations on the workpiece and then propelled back to the loading station 61 for removal of the finished workpiece from the pallet.

With the foregoing arrangement, the pallet 60 itself supports the workpiece 25 in the various machining stations 30 to avoid the need of providing comparatively expensive rotary index tables or the like in front of the machines 33 to support and enable indexing of the workpiece. Workpieces may be loaded onto and unloaded from several pallets at the single loading station 61 by an overhead crane (not shown) and thus it is not necessary to move the crane around the shop to each of the individual machines for the purpose of transporting the workpieces to and from the machines. In addition, successive pallets carrying fixtured workpieces may follow one another through each machining station to enable substantially continuous operation of the machines and to avoid long periods of machine non-use as otherwise is the case when each workpiece is moved to the machine by a crane and then fixtured at the machine itself rather than in a common set-up area remote from the machine. Accordingly, the present invention simplifies and reduces the cost of the overall machine tool organization and results in less encumbrance of the shop while at the same time enabling more efficient use of the machine tools and the shop crane.

More specifically, the pallet 60 disclosed herein is rectangular in shape and is approximately 12 feet long, 18 feet wide and 20 inches high (see FIGS. 2 and 3). The pallet includes an extremely rigid box-like frame defined by vertical front and rear plates 63, opposed vertical side plates 64 and upper and lower horizontal plates 65 and 66 all suitably welded together and reinforced by longitudinal, transverse and diagonal braces 67 (FIG. 5) which are welded and bolted to the various plates. The upper plate 66 of the pallet is flat and accurately finished and is similar to the floor plate often found on the floor of a shop in the front of many types of machine tools. Several parallel T-slots 70 (FIG. 2) are formed in and open upwardly out of the upper plate and are used in the anchoring of a workpiece fixture 71 to the pallet.

The fixture 71 (FIG. 2) is of conventional construction and has been illustrated only diagrammatically in the drawings. In brief, the fixture comprises a pair of upstanding supports 73 to which the workpiece 25 is adapted to be clamped in a very accurate position. The supports, in turn, are anchored rigidly to the pallet 60 and are located such that, when the pallet is in its final position in one of the machining stations 30, the workpiece will be located in the precise position necessary for accurate machining of the workpiece by the respective machine tool 33. To anchor the fixture supports 73 to the pallet, bolts 74 are fitted into the T-slots 70 in the top plate 65 and serve to clamp the supports to the plate.

Once installed, the fixture 71 may remain permanently on the pallet 60 as long as workpieces of the same type are to be machined. At the loading station 61, the workpiece 25 first is placed on the installed fixture by the shop crane and then is anchored to the fixture, the total weight of the pallet and the attached fixture and workpiece being approximately 150,000 pounds in this particular instance. During loading of the workpiece, the pallet is supported directly on the shop floor 31 by four rectangular rest pads 76 (FIGS. 3 and 10) anchored rigidly to and depending from the lower plate 66 and positioned near the corners of the pallet. The lower surfaces of the rest pads are located approximately ½ inches below the lower edges of the front and rear plates 63 and the side plates 64 to prevent such edges from contacting the floor.

In carrying out the invention, the loaded pallet 60 is lifted a very slight distance off of the shop floor 31 by a cushion of pressurized air and then is supported on the air cushion while being propelled and steered from the loading station 61 to the successive machining stations 30. To establish the air cushion, a number of air cells or bags 78 (FIGS. 3, 4 and 10) are carried on the underside of the pallet and are adapted to be inflated from a compressed air source (not shown). As the air bags are initially inflated, they expand into contact with the shop floor and raise the pallet so as to lift the rest pads 76 approximately ¾ inches off of the floor. Thereafter, jets of air escape from the bottoms of the air bags and react against the floor so as to raise the bags themselves off of the floor by a distance of about 0.003 inches. Accordingly, the entire pallet may be raised and supported on a thin cushion of air so as to enable relatively friction-free horizontal and edgewise movement of the pallet across the floor. As a result, only a very small force is required to move the pallet from the loading station to the machining stations in spite of the comparatively large mass of the pallet and the attached fixture 71 and workpiece 25.

In this instance, the pallet 60 carries a total of 32 air bags 78 (see FIG. 3), there being six bags in each of four inboard rows of bags located near the center portion of the pallet and extending in a fore-and-aft direction between the front and rear plates 63. In addition, an outboard row of bags is located near each of the side plates 64, and each of the outboard rows includes four air bags. The bags of each inboard row are arranged in groups of three while the bags of each outboard row are arranged in groups of two, the bags of each group being carried on a common support in the form of a substantially flat tray 80. As shown in FIG. 3, the trays of the outboard rows are located near the corners of the pallet, and the two trays within each outboard row are spaced from one another along the adjacent side plate 64 so as to leave an opening or space 81 between those two trays. Also, it will be seen that an opening or space 83 is left between each outboard row of bags and the adjacent inboard row. The rest pads 76 are located within the spaces 83.

The trays 80 are supported on the underside of the pallet 60 by a gridwork consisting of cross stringers 84 (FIG. 3) paralleling the front and rear plates 63, longitudinal stringers 85 paralleling the side plates 64, flanged guides 86 disposed below and paralleling the longitudinal stringers, and stop bars 87 paralleling the cross stringers. Each tray is mounted directly beneath the longitudinal stringers 85 by sliding the tray edgewise from the exposed outer side of the front or rear plate 63 and between a pair of the flanged guides 86 until the inner edge of the tray abuts one of the stop bars 87. The flanged guides keep the upper sides of the trays positioned against the lower sides of the longitudinal stringers 85 while enabling quick edgewise removal of the tray from the pallet in case of damage to the air bags 78.

Each of the air bags 78 is formed of nylon reinforced with urethane and is sealed around its periphery to the lower side of a circular disc 90 (FIG. 4) which is anchored to the respective tray 80 by clips 91. At its center, the air bag is fastened in face-to-face relation with the upper disc 90 by a smaller disc 93 and thus an annular chamber 94 is formed between the periphery and the center of the bag. Compressed air under a pressure of approximately 14 psi. is selectively admitted into the chamber 94 through an inlet line 95 at a rate of about 6 cfm. and serves to inflate the bag by pressurizing the chamber. As the bag initially inflates, it assumes a shape somewhat resembling a doughnut and its bottom engages and seals against the shop floor 31 along an area indicated at 96 in FIG. 4 thereby to raise the pallet approximately ¾ inches. Thereafter, jets of air escape through angularly spaced orifices 97 formed through the inner annulus of the bag and serve to pressurize a cavity 98 defined between the inner annulus, the small disc 93 and the floor 31. As the pressure builds up in the cavity, air escapes around the seal 96 between the bag and the floor to develop a leak across the seal and thereby create an air cushion or film between the floor and the bottom of the bag, the film having a thickness of about 0.003 inches. The thus established air film lifts the air bags out of frictional contact with the floor and causes vertical floating of the entire pallet to enable movement of the latter across the floor with a force of very small magnitude.

For optimum performance of the air bags 78, the floor 31 should be flat and level with variations of not more than ¼ inches within a 20 foot diameter and should be kept clean and free of chips and the like. The floor preferably is made smooth, hand-trowelled concrete whose pores are suitably sealed to prevent dissipation of the air emitted from the orifices 97. To avoid moving the air bags over any chips which might be left on the floor, flexible skirts (not shown) may be secured to the lower edge portions of the front and rear plates 63 and the side plates 64 to sweep any chips ahead of the pallet 60.

In order to supply pressurized air to the air bags 78, a main manifold 100 (FIG. 3) is located just above the trays 80 and below the lower plate 66 and extends around the inner sides of the front and rear plates 63 and one of the side plates 64. Each tray carries a sub-manifold line 101 (FIG. 13) which is connected releasably to the main manifold by quick-disconnect couplings 103 and 103a (FIGS. 3 and 13) and which communicates with the inlet lines 95 of the air bags 78 on the tray. A restriction 104 (FIG. 13) is located in each inlet line 95 so as to avoid loss of pressure in the manifolds 100 and 101 if one of the bags should happen to be ruptured. Located in the main manifold 100 are two pressure regulators 105 (FIG. 3) enabling separate adjustment of the pressure of the air delivered to the two banks of air bags located forwardly and rearwardly of the center of the pallet 60. By adjusting the pressure regulators, the pallet may be trimmed as necessary to compensate for uneven loading on the pallet.

The main manifold 100 communicates with a source of compressed air in the shop by way of a flexible hose 106 (FIG. 3) leading from the manifold. During movement of the pallet between the loading station 61 and the machining stations 30, the hose is payed out from an overhead reel (not shown) which may be moved around the shop.

Once the air bags 78 have been inflated to cause floating of the pallet 60, it is possible to move and guide the pallet across the floor 31 by manually pushing and turning the pallet because the air cushion establishes a substantially friction-free condition between the pallet and the floor. Some difficulty is encountered however, in manually starting, stopping and steering the pallet because of its high inertia. Advantageously, the pallet of the present invention carries selectively controllable power-actuated means for propelling and steering the pallet between the loading station 61 and the machining stations 30. Herein, these means comprise a pair of power-rotated castor wheels 108 (FIG. 3 and FIGS. 6 to 8) which are adapted to frictionally engage the floor to drive the pallet and which may be swiveled through at least 180° to enable random steering of the pallet. When the air bags 78 are deflated, the wheels are retracted upwardly into the pallet and do not contact the floor. After the pallet has been lifted, however, the wheels may be projected downwardly into frictional contact against the floor with approximately 1,000 pounds force on each wheel to enable propelling and steering of the pallet.

As shown in FIG. 3, the two wheels 108 are located within the spaces 81 midway between the front and rear plates 63 and are spaced equidistantly from the side plates 64, the wheels being positioned within rectangular openings or wells 109 formed in the lower plate 66. Each wheel is fast on a horizontal axle 110 (FIGS. 6 to 8) which is journaled by bearings 111 mounted on the underside of a plate 113. A reversible rotary air motor 114 is supported on the mounting plate 113 and is operable to rotate the wheel by way of a chain 115 connected between the motor and the axle 110. The mounting plate 113 carries a pair of tubular bosses 116 which are telescoped slidably over a pair of rods 117 depending from and connected rigidly to an upper drum 119. A vertically expandable bellows 120 (FIGS. 6 and 7), commonly referred to as an air spring, is connected between the mounting plate 113 and the drum 119 and is operable when inflated with pressurized air to shift the plate downwardly relative to the drum and thereby project the wheel downwardly into contact with the floor 31. Upward retraction of the wheel in response to deflation of the bellows is effected by a pair of coil springs 121 telescoped over the lower end portions of the rods 117 and compressed against the lower side of the mounting plate 113 and against retainers 123 anchored to the lower ends of the rods.

To mount the wheels 108 for swivelling, each upper drum 119 is fastened to a vertical spindle 124 (FIG. 6) which is journaled in the top plate 65 by a ball bearing 125. Steering of the wheels is effected by a reversible rotary air motor 126 (FIGS. 2 and 5) mounted on the outer side of one of the side plates 64 and connected to the adjacent drum 119 by a chain 127 (FIG. 5) which is wrapped around and anchored to the outer periphery of the drum. That drum, in turn, is connected to the other drum by a second chain 129 extending between the two drums. Accordingly, the two wheels are turned in unison and in the same direction upon energization of the air motor 126 and may be pivoted to any given position by varying the time and direction of energization of the motor. The pallet 60 thus may be propelled and steered along any selected path by driving the wheels with the air motors 114 and by pivoting the wheels with the air motor 126.

The air motors 114, the bellows 120 and the air motor 126 all communicate with the compressed air source by way of the main hose 106 and all are controlled by suitable valves (not shown) housed with a control console 130 (FIGS. 2 and 9) mounted on one of the side plates 64, the control console also housing valves for controlling inflation and deflation of the air bags 78. The different valves are adapted to be actuated manually by various levers, buttons or the like accessible from a control panel 131 on the top of the console. For example, a button 133 may be pushed in and pulled out to lower and raise the drive wheels 108. The latter are adapted to be driven and steered in either a dual control mode or a single control mode as determined by the position of a push-pull button 134 on the control panel. When in the dual control mode, the two wheels may be turned for steering purposes and both are rotatably driven in unison and in the same direction. Dual control of the wheels is effected from the panel 131 by means of a pivoted joy stick 135 which may be moved upwardly to drive the wheels in unison in one direction, downwardly to drive the wheels in unison in the opposite direction, swung to the left to pivot the wheels simultaneously in one direction and swung to the right to pivot the wheels simultaneously in the opposite direction. To enable the pallet driver to determine the angular position of the wheels, a flexible cable (not shown) extends between the air motor 126 and the control panel. The cable turns when the air motor is energized to steer the wheels and serves to turn a pointer 136 on the control panel so as to inform the driver of the position of the wheels.

When in the single contol mode, the wheels 108 are prevented from swivelling and usually are held parallel to the side plates 64 in the position shown in FIGS. 3 and 5 so that the pallet 60 will move straight forwardly or straight rearwardly when the wheels are both driven in the forward or reverse directions. By moving a lever 137 (FIG. 9) upwardly or downwardly from a centered neutral position, one of the wheels may be separately driven in forward or reverse directions and, in a similar manner, the other wheel may be driven separately and in forward or reverse directions by moving a lever 139 upwardly or downwardly. If one of the wheels is driven while the other is stationary, the pallet will automatically turn about the stationary wheel. If both wheels are driven simultaneously but in opposite directions, the pallet will turn or index about a vertical axis extending through the center of the pallet, that is to say, the pallet will turn about its own center.

To control inflation of the air bags 78, a spring-biased "deadman" lever 140 (FIG. 9) is pivoted on the joy stick 135. The bags are inflated when the driver squeezes the lever inwardly and, when released, the lever automatically springs outwardly to cause deflation of the bags. Thus, the pallet 60 is lowered automatically if the driver leaves the control console 130. Suitable pilot valves and associated pneumatic circuitry prevent lowering and driving of the friction wheels 108 unless the air bags are inflated and automatically cause the wheels to retract as an incident to deflation of the bags.

In order to reduce the complexity of the drawings, the various valves within the control console 130, the pneumatic circuitry of which the valves form a part, and the mechanical linkages between the valves and the different levers and buttons have not been illustrated. Such details are well within the scope of those of ordinary skill in the art and need not be spelled out specifically in order to gain an understanding of the present invention.

To summarize the invention as described thus far, the workpiece 25 is attached to the fixture 71 on the pallet 60 while the latter is in the loading station 61 and is supported on the shop floor 31 by the rest pads 76. After loading of the workpiece, the air bags 78 first are inflated to lift the pallet from the floor and then the wheels 108 are projected downwardly into contact with the floor to facilitate driving and steering of the pallet. With the wheels in the dual control mode, the pallet then is propelled and steered from the loading station toward the first machining station 30a along the most conveniently available path such as that indicated by the reference numeral 141 in FIG. 1.

In accordance with a most important aspect of the invention, the loaded pallet 60 is guided in a forward direction onto a pallet base 143 (FIGS. 1, 14 and 14A) formed on the shop floor 31 at the machining station 30a and, while still being supported on the air cushion, is located accurately and held against horizontal movement in all directions by coacting guides 144 and 145 (FIG. 14A) on the pallet and the pallet base, respectively. After the pallet has been located and held by the guides, the air bags 78 are deflated to release the air cushion and thereby lower the pallet. Lowering of the pallet continues until vertical abutments or locators 146 depending from the pallet engage and rest upon precisely finished landing pads 147 on the pallet base. The locators 146 and the landing pads 147 coact to position the pallet at a precisely fixed elevation and with the pallet positioned horizontally by the guides 144 and 145, the workpiece 25 thus is located in all three dimensions in a very precise position in front of the machine tool 33a to enable accurate performance of the machining operation.

As shown in FIGS. 14 and 14A, the pallet base 143 is formed with just slightly larger rectangular dimensions than the pallet 60 and comprises a rigid framework of interconnected longitudinal and transverse I-beams 150 and 151 (FIG. 14) recessed in a pit in the shop floor 31 and supported on suitable subframe members which have all been indicated by the reference numeral 152 and which are tied to the foundation of the shop. The upper surfaces of the beams are flush with the upper surface of the shop floor 31, and the spaces between the various beams are filled with concrete which is accurately trowelled so that the upper surface 153 of the pallet base is flush with and forms a continuation of the shop floor. The upper surface of the pallet base is smooth and level and preferably is sealed by a very thin urethane membrane.

The horizontal locating guides 145 in the pallet base 143 preferably are in the form of elongated upright dowels (see FIGS. 18 and 22) which are normally disposed in inactive retracted positions in which the upper ends of the dowels are just below the upper surface 153 of the base but which are adapted to be moved to active extended postions in which the upper ends of the dowels project approximately 3 inches above the base. One dowel 145 is located near each side 154 (FIGS. 14 and 14A) of the base with each dowel being positioned midway between the front 155 and the rear 156 of the base. Normally, the pallet 60 approaches the base 143 from the front 155 thereof while the dowels are retracted and, during the final approach, is positioned with its front plate 63 paralleling the front 155 of the base. (See the dot-dash position of the pallet in front of the machining station 30a in FIG. 1.) The pallet then is driven forwardly to an approximately centered position on the base, the drive wheels 108 are retracted and thereafter the dowels are projected upwardly to their active positions. The upper ends of the dowels telescope into and seat within the guides 144 on the pallet 60 to first shift the pallet to and locate the pallet in a very accurate horizontal position and then to hold the pallet in such position during machining of the workpiece 25.

Herein, the guides 144 on the pallet 60 are in the form of female receptacles or seats adapted to receive the upper ends of the dowels 145 with a precise fit, there being one seat 144 fixed to the bottom of the pallet just outboard of each castor wheel 108 and midway between the front and rear plates 63 as shown in FIG. 3. One of the seats 144 comprises a cylindrical boss 160 (FIGS. 11 and 18) which is welded to the underside of the lower plate 66 and which rigidly receives and supports an accurately machined bushing 161 formed with a centrally located and downwardly opening hole 163 of circular cross-section. The other seat 144 comprises a generally rectangular block 164 (FIG. 12) which also is welded to the lower plate 66 and which receives and supports a correspondingly shaped insert 165. The latter is accurately machined and is formed with a downwardly opening slot 166 which is elongated along a line extending parallel to the front and rear plates 63. Suitable shims 167 are located between the block 164 and the insert 165 so that the insert can be located to make the centerline of the slot 166 lie along a line paralleling the front and rear plates 63 and intersecting the axis of the hole 163.

As shown in FIGS. 11, 12 and 18, the hole 163 and the slot 166 taper upwardly and are sized at their lower ends to receive the upper ends of the dowels 145 with a clearance of approximately ½ inches so that the dowels may enter the hole and the slot even though the latter are not alined perfectly with the dowels. The upper ends of the dowels preferably are formed by accurately machined and hardened caps 169 (FIG. 18) which are fastened by screws 170 to the main portions of the dowels. The upper end portions of the caps are formed with a spherical contour and are adapted to telescopically seat into and mate with the upwardly tapered hole 163 and slot 166 with a tight accurate fit after being projected upwardly into the hole and the slot.

During initial forward movement of the pallet 60 onto the pallet base 143, the dowels 145 are held in their retracted positions shown in full in FIG. 18 so as to permit passage of the pallet over the base without interference from the dowels. After the pallet has been located on the base in an approximate centered position in which the hole 163 and the slot 166 of the dowel seats 144 are alined generally vertically with the dowels (see FIG. 14A), the wheels 108 are retracted to allow the pallet to hover over the base while supported on the cushion of air. Thereafter, the dowels are shifted upwardly as shown in phantom in FIG. 18 and in full in FIGS. 14A and 22 to cause the spherical caps 169 to telescope into the hole 163 and the slot 166. Upon moving upwardly into the hole 163 and the slot 166, the dowel caps 169 shift the pallet horizontally either left or right and/or forwardly or rearwardly through a slight distance as the caps contact and seek mating wedging engagement with the tapered walls of the hole and the slot. In other words, the spherically shaped caps 169 on the dowels 145 cam against the tapered walls of the hole 163 and the slot 166 to cause such horizontal shifting of the pallet as may be necessary to center the hole and the slot directly and precisely over the dowels. Such lateral shifting of the pallet by the dowels is possible in spite of the extreme weight of the pallet by virtue of the fact that the pallet is supported in a substantially friction-free condition on the air cushion during wedging of the dowels into the hole and the slot and thus can be moved easily in a horizontal direction simply by the force created as the dowels cam against the walls of the hole and the slot.

The dowel seats 144 and the dowels 145 are located on the pallet 60 and the pallet base 143 in such positions that, when the dowels are telescoped into the seats, the pallet is held in the particular horizontal position which is necessary to effect accurate machining of the fixtured workpiece 25 by the machine tool 30 in the machining station 30a. In this particular instance, the dowels 145 are located such that a horizontal line extending between the centers of the dowels parallels the path of travel of the slide 37 of the machine tool 33a. The workpiece is centered on the pallet in both horizontal directions while the two seats 144 are located midway between the front and rear plates 63 and are spaced equidistantly from the side plates 64. Accordingly, when the pallet is located by the dowels, the axis of the workpiece 25 extends perpendicular to the path of travel of the slide 37 at a given point along such path while the end face of the workpiece is spaced a precise predetermined distance from the front of the machine tool.

Advantageously, the formation of the elongated slot 166 in one of the dowel seats 144 enables accurate horizontal location of the pallet 60 while avoiding the need of holding an extremely accurate center distance between the two dowels 145. That is, upon telescoping of one of the dowels 145 into the hole 163 of the respective dowel seat 144, the pallet is held against bodily horizontal movement in all directions and is capable only of swinging about that dowel. As a result, the other dowel need only prevent swinging of the pallet and need not hold the pallet against horizontal bodily movement. Thus, such other dowel need not project into a precisely located hole of circular cross-section similar to the hole 163 but instead may telescope into the elongated slot 166 at different portions along the length of the slot. Accordingly, through the provision of the slot 166, precise horizontal location of the pallet can be achieved without establishing an exact center distance between the dowels 145, without establishing an exact center distance between the dowel seats 144, and without need of contending with changes in the center distances as might be caused by differential thermal expansion between the dowels 145 and the pallet base 143 on the one hand and the dowel seats 144 and the pallet 60 on the other hand.

To support the dowels 145 in the pallet base 143, housings 171 (FIGS. 14 and 15) are anchored to the outboard sides of the longitudinal beams 150, are recessed into the base and are closed by upper plates 173 which are located flush with the upper surface 153 of the base. Each dowel is telescoped into a sleeve 174 (FIG. 18) depending from the upper plate 173 of the housing 171 and is guided for up and down sliding by bushings 175 within the sleeve. To move the dowels between their retracted and projected positions, an hydraulic cylinder 176 is supported on the lower end of each sleeve and includes a reciprocable plunger 177 connected to the lower end of the dowel. Actuation of the cylinder may be controlled from a control valve (not shown) located adjacent the pallet base and suitable sensing means may be provided for detecting and indicating when the dowels are in their retracted positions and when they are seated in the hole 163 and the slot 166. If for some reason the hydraulic pressure is lost, the dowels are extended to or held in their projected positions by a coil spring 179 (FIG. 18) compressed between the lower end of each sleeve 174 and a collar 180 located intermediate the ends of the dowel. Accordingly, there is no danger of hydraulic failure resulting in lowering of the dowels while the pallet is located by the dowels during machining of the workpiece.

As mentioned above, the pallet 60 is equipped with depending vertical locators 146 (FIGS. 14A and 22) which engage and rest on landing pads 147 on the pallet base 143 when the pallet is lowered after having been located against horizontal movement by the dowels 145. The locators 146 and the landing pads 147 are accurately machined and serve to position the pallet at a precise elevation and in a precisely horizontal plane in the machining station 30a.

In this instance, the locators 146 (see FIGS. 3 and 10) are in the form of depending vertical bosses welded rigidly to the lower plate 66 of the pallet 60 and located near the corners thereof just inboard of the rest pads 76. There are thus four locating bosses 146 on the pallet and all are arranged symmetrically relative to the pallet in that the bosses lie on the corners of an imaginary rectangle which is centered with respect to the pallet.

The locating bosses 146 are generally cylindrical and are capped on their lower ends by detachable metal wear discs 181 (FIG. 10) whose lower surfaces are all disposed in the same horizontal plane and are accurately machined so as to be perfectly flat. As shown in FIG. 19, the lower surface of each boss 146 is spaced a short distance (e.g., 1/8 inch) upwardly from the lower surface of the adjacent rest pad 76. With this arrangement, the accurately finished lower surfaces of the bosses 146 do not contact the main shop floor 31 and will not be damaged by the floor when the air bags 78 are deflated and the pallet 60 is being supported on the floor by the rest pads 76.

The landing pads 147 (FIGS. 14, 14A and 19) comprise four metal discs positioned on the pallet base 143 to aline vertically with the locating bosses 146 when the pallet 60 is held in its precise horizontal position by the dowels 145. As shown in FIG. 14, the four landing pads 147 are located inwardly of the dowels and define the corners of a rectangle arranged symmetrically relative to the dowels. The upper surfaces of all of the landing pads are disposed in precisely the same horizontal plane and each pad is anchored to a block 183 (FIG. 19) bolted to the subframe 152 beneath the base 143.

As shown in FIG. 19, the upper surface of each landing pad 147 is precisely flat and horizontal and projects just a slight distance (e.g., ¼ inch) above the upper surface 153 of the pallet base 143. The spacial relationship, together with that between the lower surfaces of the rest pads 76 and the locating bosses 146, enables the locating bosses to support the pallet 60 vertically on the landing pads 147 and yet avoids contact between the rest pads 76 and the upper surface of the pallet base so that the elevational position of the pallet is determined solely by the locating bosses and the landing pads and is not affected by the rest pads.

Advantageously, means are provided on the pallet base 143 for automatically guiding the pallet 60 into an approximate proper horizontal position over the dowels 145 and the landing pads 147 as the pallet is moved into the base. Herein, these means comprise a pair of rollers 185 (FIGS. 14 and 14A) spaced from one another along the direction of approach of the pallet to the base and coacting with the underside of the pallet to center the latter in one transverse direction on the base in a position in which the dowel seats 144 and the locating bosses 146 are approximately alined in a left-right direction (FIG. 14A) with the dowels 145 and landing pads 147, respectively. The rollers 185 are located rearwardly of the center of the base and are positioned on the front-to-rear centerline of the base so as to be disposed midway between the dowels 145. Each roller is cylindrical and is journaled to turn on a vertically extending bolt 186 (FIG. 16) anchored to a block 187 secured to the beams 150 and 151 of the base 143. The rollers project upwardly above the upper surface 153 of the base a distance of about 3 inches and, during approach of the pallet onto the base, fit into a guide channel 189 (FIGS. 3, 14A and 16) on the underside of the pallet to locate the latter in an approximate left-right direction on the base.

As shown in FIGS. 3 and 16, the guide channel 189 opens downwardly from the underside of the pallet 60, extends between the front and rear plates 63 and is centered between the two side plates 64. The channel is defined by two spaced rails 190 suitably secured to the lower plate 66 and spaced horizontally from one another a distance somewhat greater than the diameter of the rollers 185. To facilitate initial guidance of the channel 189 onto the rollers 185, enlarged throats 191 (FIG. 3) defined by inwardly converging walls 193 are formed at the ends of the channel and gradually taper inwardly toward the channel, the throats providing a lead-in to the channel.

During final edgewise approach of the pallet 90 toward the front 155 of the pallet base 143, the driver of the pallet may steer and maneuver the pallet into such a position that the channel 189 is approximately in line with but is spaced fowardly from the two guide rollers 185. In this position of the pallet, the front and rear plates 63 extend generally perpendicular to the front-to-rear centerline of the pallet base while the side plates 64 extend substantially parallel to such centerline. To assist the driver in steering the pallet to this position, a front-to-rear extending line (not shown) may be painted at an approximate position along one side 154 of the pallet base and the driver may aline one of the side plates 64 with the line.

After being thus positioned, the pallet 60 is driven forwardly and, during such movement, the walls 193 of the forward throat 191 encounter the front guide roller 185 and enable the driver to maneuver the pallet as necessary to cause the guide channel 189 to receive the front roller (see FIG. 16). Thereafter, the guide channel 189 rides past the front roller and subsequently receives and rides past the rear roller. Once both rollers have been received in the channel, the pallet is substantially confined against left-right movement on the pallet base 143 and also is substantially confined against swinging about an upright axis. When the pallet is thus confined, the dowel seats 144 on the pallet are substantially alined in a left-right directon with the dowels 145 in the pallet base and may thus be alined vertically with the dowels when the pallet is subsequently centered on the pallet in a front-rear direction. It is important to note, however, that lateral clearance exists between the guide rollers 185 and the rails 190 of the channel 189. When the locating dowels 145 are subsequently projected into the seats 144, such clearance allows the pallet to shift either leftwardly or rightwardly on the rollers 185 to assume the extremely accurate predetermined position dictated by the dowels as the latter cam against the walls of the hole 163 and the slot 166 in the dowel seats.

As a further advantageous feature of the invention and to enable approximate location of the pallet 60 on the pallet base 143 in the front-rear direction, a pair of spring-loaded stops or bumpers 195 (FIGS. 14A and 17) are located near the rear 156 of the pallet base. One bumper is positioned adjacent each side 154 of the base and each is located well above the upper surface 153 of the base to engage the front plate 63 of the pallet during final movement of the pallet onto the base.

In this instance, each bumper 195 (FIG. 17) comprises a horizontal cylinder 196 attached to a flange 197 upstanding from the rear end of the outboard longitudinal beam 150. A coil spring 199 is telescoped into the cylinder and serves to urge a piston 200 outwardly against a cap 201 which closes the forward end of the cylinder. The piston carries a horizontal plunger 203 which projects slidably through the cap and overhangs the extreme rear portion of the pallet base 143. When the plungers of the bumpers are fully extended and are in engagement with the front plate 63 of the pallet 60, the latter is approximately centered in a front-rear direction on the pallet base.

After having been substantially confined against left-right movement by the rollers 185, the pallet 60 is driven forwardly by the friction wheels 108 until the front plate 63 of the pallet engages the plungers 203 of the bumpers 195 and forces the plungers inwardly against the bias of the springs 199. As the pallet encounters the resistance of the compressed springs and is thus stopped, the drive motors 114 for the friction wheels stall and the pallet thus comes to rest against the depressed plungers. The driver then de-energizes the drive motors 114 and retracts the friction wheels 108 to leave the pallet supported on the air cushion. Once the wheels have been retracted, the springs 199 expand and force the plungers outwardly to move the pallet backwards (i.e., from the rear 156 toward the front 155 of the base 143) through a slight distance equal to the stroke of the plungers, such reverse movement of the pallet by the springs being possible because of the free-floating condition of the pallet. With the plungers full extended, the pallet is approximately located in the proper front-rear direction on the pallet base. Since the pallet previously was located approximately in the proper left-right direction by the rollers 185, the seats 144 on the pallet 60 thus are brought into substantial vertical alinement with the dowels 145 so that the latter subsequently can be projected upwardly and telescoped into the hole 163 and the slot 166 of the seats to establish the final precise horizontal location of the pallet.

In some instances, it is desirable to clamp the accurately located pallet 60 to the base 143 to insure against upward movement of the pallet during machining of the workpiece 25. For this purpose, four clamping brackets 210 (FIGS. 2, 3 and 21) are attached rigidly to the outer surfaces of the side plates 64 adjacent the corners of the pallet and each is formed with a vertical hole 211 (FIG. 21) adapted to receive a clamping bolt 213. By manually inserting the bolts 213 through the holes 211 and threading the bolts into holes 214 in the pallet base 143, the pallet may be clamped to the base and prevented from moving upwardly under the forces applied to the workpiece 25 during the machining thereof.

As a safety measure, inflation of the air bags 78 and lowering of the friction wheels 108 are prevented as long as the pallet 60 is clamped to the base 143 by the bolts 213. For this purpose, a valve 215 (FIGS. 20 and 21) is carried on each clamping bracket 210 and all of the valves are connected in series in a pneumatic pilot circuit (not shown) which must be enabled before the air bags can be inflated and the friction wheels can be lowered. When the bolts 213 are in place in the brackets 210, the heads 216 of the bolts engage and depress spring-loaded plungers 217 associated with the valves and cause venting of the valves to the atmosphere to disable the pilot circuit. Upon removal of the bolts 213 from the brackets 210 as an incident to unclamping the pallet, the plungers 217 extend and shift the valves 215 to enable the pilot circuit and permit inflation of the air bags 78 and lowering of the wheels 108. With the foregoing arrangement, a lifting force cannot be applied to the pallet either by the air bags or the friction wheels as long as the pallet is clamped to the base 143 and thus there is no danger of applying bending stresses to the pallet and the workpiece as otherwise would be the case if an attempt were made to lift the pallet while the latter is clamped to the base.

SUMMARY OF OPERATION

Now that the elements of the pallet 60 and the pallet base 143 have been explained, it will be helpful toward a complete understanding of the invention to summarize the overall procedure which is followed in locating the pallet on the base in the first machining station 30a. As pointed out above, the loaded pallet is steered and propelled along the path 141 (FIG. 1) from the loading station 61 to the machining station 30a by means of the friction wheels 108 while in the dual control mode and while supported on the air cushion established by the air bags 78. During its final approach toward the pallet base, the pallet is maneuvered into a position in which the front plate 63 is generally parallel to the front 155 of the base and in which the guide channel 189 is in line with the guide rollers 185. At this time, the dowels 145 are disposed in their retracted positions so that their upper ends are substantially flush with or disposed slightly below the upper surface 153 of the base 143.

After the channel 189 has been alined with the rollers 185, the pallet 60 is driven forwardly and, during such movement, the rollers locate the pallet in a left-right position approximating that occupied by the pallet in its final precise location. Foward movement of the pallet is continued until the front plate 63 engages and depresses the plungers 203 of the bumpers 195. The drive motors 114 for the friction wheels 108 then are de-energized and the wheels are retracted upwardly to leave the pallet floating on the pallet base 143. Once the wheels have been retracted out of frictional contact with the base, the plungers 203 are extended by the springs 199 and move the free floating pallet rearwardly through a short distance. When the pallet comes to rest, the hole 163 and the slot 166 of the seats 144 on the pallet are positioned above the dowels 145 while the locating bosses 146 are positioned above the landing pads 147. The pallet now is ready for shifting to its final precise horizontal location.

Such shifting is achieved by projecting the dowels 145 upwardly into the hole 163 and the slot 166 while the pallet 60 is still supported on the air cushion. Because the pallet is in a free-floating condition, the dowels are capable of shifting the pallet horizontally as they enter into the hole and the slot and cam against the walls thereof. By virtue of such camming and shifting, the hole 163 is centered precisely on its underlying dowel 145 while the walls of the slot 166 are brought into precise straddling relation with the other dowel. The pallet thus is positioned accurately as determined by the dowels and is located in the precise horizontal position necessary to effect accurate machining of the workpiece 25. It should be noted that the dowels and the walls of the hole and the slot are subjected to virtually no wear during positioning of the pallet since little force is required to shift the pallet.

After being located horizontally by the dowels 145, the pallet 60 is positioned at a precise elevation simply by deflating the air bags 78 to allow the pallet to descend under its own weight until the locating bosses 146 engage and stop against the landing pads 147. With the posts seated on the landing pads, the pallet is held at a precise elevation and thus is located accurately in all three dimensions so that precision machining of the workpiece 25 can be effected. During the descent of the pallet, the dowels are forced downwardly a short distance and a small amount of pressure fluid escapes from the lower ends of the cylinder 176 to permit downward movement of the dowels. Accordingly, the dowels lower automatically as an incident to lowering of the pallet but remain seated in the hole 163 and the slot 166 to maintain the precise horizontal location of the pallet. When located by the dowels and the landing pads, the pallet is positioned in all three dimensions within 0.001 inch of a pre-established position necessary to effect precision machining of the workpiece.

After the pallet 60 has been located accurately in the first machining station 30a and clamped by the bolts 213 if necessary, the forward end of the workpiece 25 may be machined. Upon completion of the machining, the pallet may be unclamped and backed out of the machining station after lowering the dowels 145 and the friction wheels 108 and inflating the air bags 78. If the opposite end of the workpiece also is to be machined at the machining station 30a, the pallet is backed out of the station while the friction wheels are under the single control mode. That is, the two wheels are locked against swivelling, are held parallel to the side plates 64 as shown in FIG. 3, and are both driven in a reverse direction to back the pallet straight out of the machining station 30a and off of the pallet base 143.

After the pallet 60 has been backed well clear of the guide rollers 185, the driver stops the pallet and then positions the control levers 137 and 139 (FIG. 9) to cause one of the wheels 108 to drive in one direction and the other wheel to drive in the opposite direction. This results in horizontal indexing of the pallet about its vertical centerline as indicated by the path 220 in FIG. 1 and, after the pallet has indexed 180°, the driver positions the control levers 137 and 139 to cause both wheels to turn in the forward direction to return the pallet forwardly toward the pallet base. Since the left-right position of the pallet did not change as a result of reversing and indexing the pallet while under the single control mode, the guide channel 189 remains in line with the guide rollers 185 and thus the pallet may be propelled onto the pallet base without need of the driver steering the wheels at all to initially aline the channel with the rollers. Accordingly, the ability to drive and index the pallet under the single control mode simplifies re-positioning of the pallet on the base 143 following the indexing. Also, it should be noted that the symmetrical arrangement on the pallet and the base of the dowel seats 144, the dowels 145, the locating bosses 146, the landing pads 147, the guide rollers 185 and the guide channel 189 enable the pallet to be located on the base in either one of two positions spaced angularly 180° from one another so that the pallet can be selectively oriented to effect machining of either end of the workpiece 25. With suitable modifications, the various guide and locating elements on the pallet and the base can be arranged to enable indexing of the pallet through angular distances other than 180°.

Once indexed, the pallet 60 is located accurately in the first machining station 30a in the same manner as described previously. After machining of the opposite end of the workpiece 25 is completed, the pallet may be backed out of the first machining station and steered and propelled along a random path 221 (FIG. 1) to the second machining station 30b while in the dual control mode. The second machining station 30b includes a pallet base 143b identical to that in the first station and thus the pallet may be located accurately in the second machining station for performance of a second machining operation and then indexed if desired. Thereafter, the pallet is steered along a random path 223 to the third machining station 30c so that the workpiece can be machined by the stub boring machine 33c.

The pallet base 143c (see FIGS. 1 and 23) in the third machining station 33c is functionally identical and structurally similar to those in the stations 33a and 33b. That is, the pallet base 143c includes dowels, landing pads, guide rollers and bumpers similar to the elements 145, 147, 185 and 195 described in conjunction with the first machining station 30a. The pallet base 143c, however, is carried on and movable with the slide 53 (FIG. 23) of the stub boring machine 33c rather than being stationarily located in front of the machine. The slide 53 is positioned below the shop floor 31 as shown in FIG. 23 and the upper surface 153c of the pallet base 143 is flush with the upper surface of the floor.

While the work slide 53 is retracted to the position shown in full in FIG. 23, the pallet 60 is steered and propelled from the illustrated dash-dot position on the shop floor 31 and onto the pallet base 143c carried on the slide. The pallet then is located accurately on and clamped to the pallet base in the manner described previously. Thereafter, the slide 53 is advanced to the position shown by the dash-double dot lines in FIG. 23 and carries the accurately located pallet toward the spindle 49 first at a traverse rate and then at a slower feed rate for machining of the workpiece 25. Upon completion of the machining operation, the slide is retracted and the pallet is backed off of the pallet base 143c and returned to the shop floor 31 for indexing, for movement to other machining stations or for delivery back to the loading station 61.

Accordingly, the pallet 60 is located accurately in the third machining station 30c in the same fashion as in the first and second stations 30a and 30b except that the base 143c for locating the pallet is positioned on the movable slide 53 rather than being located in a stationary position. The workpiece 25 thus may be advanced and retracted while still being held in an accurately located position on the slide.

It will be appreciated that in certain instances it is not necessary to locate the workpiece 25 in an extremely accurate position on the pallet 60. For example, when the internal surfaces of the bore in the workpiece are to be machined by the stub boring machine 33c, it is not necessary to locate the workpiece on the pallet with such accuracy that, when the pallet is subsequently located on the slide 53, the centerline of the rough bore in the workpiece will coincide exactly with the centerline of the spindle 49. Instead, the workpiece need only be located on the pallet with such accuracy that the dimensional difference between the centerlines of the rough bore and the spindle will be less than the amount of stock to be removed from the bore. The true centerline of the bore then is established during boring of the front half of the workpiece. When the pallet is subsequently indexed and re-positioned on the slide for boring of the other half of the workpiece, the accurate repeatability of locating the pallet on the pallet base will cause the true centerline of the bore to coincide with the centerline of the spindle within 0.001 inch so that the front and rear halves of the bore will be concentric when the machining is completed.

We claim as our invention:

1. A method of transporting, accurately locating and machining a workpiece in a machine shop, said method comprising the steps of fastening the workpiece to the top of an underlying pallet in a loading station in the shop, vertically supporting the pallet and the attached workpiece on an underlying cushion of pressurized air established directly between the pallet and the floor of the shop and impinging directly against the shop floor, propelling and steering the air-supported pallet across the shop floor along a random path from said loading station to a machining station in the shop, accurately locating said pallet in all three dimensions in a precisely determined position in said machining station, and performing a machining operation on the workpiece on the pallet while the latter is located in said precisely determined position in said machining station.

2. A method as defined in claim 1 further including the steps of vertically supporting the pallet on a cushion of pressurized air upon completion of said machining operation, propelling the air-supported pallet out of the machining station, turning the pallet about an upright axis to index the workpiece, propelling the turned pallet back into said machining station, and re-locating the turned pallet in the same precisely determined position in said machining station to enable the performance of an additional machining operation on the indexed workpiece.

3. A method as defined in claim 1 further including the steps of accurately locating said pallet in said machining station against horizontal movement in all directions while the pallet is supported on said cushion of air, releasing the cushion of air to lower the pallet while holding the latter against horizontal movement in all directions, and locating the pallet at a precisely predetermined elevation and in a precisely horizontal plane automatically as an incident to the completion of such lowering.

4. A method of transporting, accurately locating and machining a workpiece in a machine shop, said method comprising the steps of fastening the workpiece in a predetermined location relative to and on the top of an underlying pallet in a loading station in the shop, vertically supporting the pallet and the attached workpiece on an underlying cushion of pressurized air established directly between the pallet and the floor of the shop and impinging directly against the shop floor, propelling and steering the air-supported pallet across the shop floor and along a random path from said loading station toward a machining station in the shop, guiding the pallet into said machining station along a predetermined horizontal path, stopping the pallet in said machining station in an approximate position along said horizontal path, shifting the pallet slightly from said approximate position and accurately locating the pallet in said machining station against horizontal movement in all directions while the pallet is supported on said air cushion, releasing the air cushion to lower the pallet while holding the latter against horizontal movement in all directions, locating the pallet at a precisely determined elevation in said machining station automatically as an incident to such lowering, and performing a machining operation on the workpiece on the pallet while the latter is located at said precisely determined elevation and is located against horizontal movement in all directions.

5. For transporting a rigid pallet with a workpiece fixed on the top thereof across a rigid horizontal floor of a machine shop from a loading station in the shop to an accurate final position in a working station in the shop preparatory to performing a precision operation on the workpiece, the method which includes the steps of a. forming directly between said floor and the bottom of said pallet at said loading station a compressed air cushion which impinges directly against the floor to lift the pallet and workpiece and floatingly support the same above the floor, b. propelling the floating pallet along said floor while steering the same into said working station and toward said final position, c. positively guiding the floating pallet to and accurately locating and stopping the same directly above said final position, d. releasing the pressure forming said air cushion whereby to allow lowering of the pallet toward said floor, e. and positively interrupting the lowering of said pallet before the latter engages the floor thereby to locate the workpiece vertically in said final position for said precision operation.

6. Apparatus for transporting a workpiece from a loading station and for locating the workpiece accurately in a machining station, said apparatus comprising a pallet, means on said pallet for clamping the workpiece rigidly to the top of the pallet at said loading station, selectively controllable means for creating a compressed air cushion beneath the pallet to enable vertical floating of the pallet as the latter is moved from said loading station to said machining station, a pallet base in said machining station, coacting means on said pallet base and said pallet for holding said pallet against horizontal movement in all directions in said machining station and for locating the pallet in a precise horizontal position in the machining station while the pallet is supported on said air cushion, said coacting means comprising at least two spaced dowels on said pallet base, a pair of dowel-receiving seats on the underside of said pallet and positioned over said dowels when said pallet is in said machining station, actuators for moving the dowels from retracted positions adjacent the pallet base to extended positions projecting into said seats thereby to locate the pallet against horizontal movement in all directions, and cooperating means upstanding from said pallet base and depending from said pallet for locating the pallet at a precisely predetermined elevation in said machining station after release of said air cushion to lower the pallet.

7. Apparatus as defined in claim 6, in which the upper end portions of said dowels define spherical surfaces, one of said seats comprising a downwardly opening hole of circular cross-section for telescopically receiving the upper end portion of the respective dowel, the other of said seats comprising an elongated downwardly opening slot for telescopically receiving the upper end portion of the other dowel, the walls of said hole and said slot being tapered upwardly and sized to mate snugly with the upper end portions of the telescoped dowels.

8. Apparatus as defined in claim 6 in which said dowels are supported by said actuators for downward yielding from said extended positions when said air cushion is released to lower the pallet.

9. In a machine tool orgainization, the combination of, a. a substantially level horizontal length of floor presenting a rigid surface and defining a work loading station and a spaced machining station, b. a pallet for transporting a workpiece between said stations and having sufficient rigidity to support a heavy workpiece on the top thereof for the performance of a precision machining operation on an exposed area of the workpiece, c. means on said pallet rigidly clamping a workpiece on the top thereof in a position corresponding to the position required for performance of said precision machining operation when said pallet is disposed and held in a final position in said machining station, d. selectively controllable means for creating a compressed air cushion between said floor surface and the underside of said pallet whereby to raise the pallet free of said surface and floatingly support the pallet for movement along the surface into said machining station, e. power driven means selectively controllable to propel the floating pallet and the workpiece thereon and to steer the pallet along a random path above said surface and into said machining station, f. guides rigid with said floor and the floating pallet and acting after movement of the pallet into said machining station to locate the pallet against horizontal movement in all directions and precisely above said final position, and g. rigid upwardly facing landing pads on said floor and opposed abutments on said pallet brought into vertical alinement in the horizontal positioning of the pallet and engaging each other upon release of said air cushion and lowering of the pallet whereby to locate the pallet precisely in said final machining position, said guides allowing such lowering of the pallet while retaining the precise horizontal position of the pallet.

10. For supporting and positioning heavy workpieces for a machining operation, a. an elongated floor having a rigid, smooth and level surface defining spaced loading and machining stations, b. a work support in the form of a rigid pallet above said surface, c. means on said pallet for releasing and distributing compressed air over the bottom area of the pallet to raise the pallet a short predetermined distance above the surface all around the periphery of the pallet and provide a cushion floatingly supporting the pallet for free edgewise movement, d. a plurality of upwardly facing locating surfaces at said machining station disposed in a common horizontal plane and spaced above said floor surface less than said predetermined distance, e. means selectively operable after raising of said pallet at said loading station to propel and steer the pallet along said surface to a position above said locating surfaces, f. means upstanding from said floor and cooperating with depending surfaces on said pallet to locate the latter in one direction as the floating pallet approaches said position, g. stop means limiting the approaching movement of the pallet in a transverse direction whereby to locate the pallet edgewise approximately in said position, h. dowels movable between said floor and said pallet and operable when activated to effect final edgewise location of the pallet precisely in said position, i. and selectively controllable means for activating said dowels while said pallet is supported by said air cushion and for thereafter releasing the compressed air cushion beneath said pallet so as to lower the latter against said locating surfaces with the pallet precisely located in all directions in said machining station.

11. Apparatus for transporting a workpiece from a loading station and for locating the workpiece accurately in a machining station, said apparatus comprising a pallet, means on said pallet for clamping the workpiece rigidly to the top of the pallet at said loading station, selectively controllable means for creating a compressed air cushion beneath the pallet to enable vertical floating of the pallet as the latter is moved from said loading station to said machining station, a pallet base in said machining station, coacting means on said pallet base and said pallet for holding said pallet against horizontal movement in all directions in said machining station and for locating the pallet in a precise horizontal position in the machining station, and cooperating means on said pallet base and said pallet for locating the pallet at a precisely predetermined elevation in said machining station after release of said air cushion to lower the pallet, said cooperating means comprising spaced landing pads rigid with said pallet base and formed with accurately finished upper surfaces all disposed in a common horizontal plane, and spaced locators depending from said pallet and having accurately finished lower surfaces all disposed in a common horizontal plane, the lower surfaces of said locators resting on the upper surfaces of said landing pads when said pallet is held in said precise horizontal position and after release of said air cushion.

12. Apparatus as defined in claim 11 further including rest members on the underside of the pallet in horizontally spaced relation to said locators and having lower surfaces spaced a predetermined distance below the lower surfaces of said locators, said rest members supporting said pallet on an underlying floor when the pallet is out of said machining station and said air cushion is released thereby to avoid contact of the lower surfaces of said locators with the floor, said pallet base being formed with a level horizontal surface, and the upper surfaces of said landing pads being spaced above said horizontal surface by a distance greater than said predetermined distance to avoid contact of said rest members with said horizontal surface when said locators are resting on said landing pads.

13. Apparatus as defined in claim 11 further including clamps selectively operable to anchor said pallet to said pallet base to prevent vertical lifting of the pallet from the base, and means responsive to the position of said clamps and acting on said selectively controllable means to prevent establishment of said air cushion until said clamps are released to permit vertical lifting of said pallet.

14. Apparatus as defined in claim 11 further including power-rotated castor wheels on the underside of said pallet for propelling said pallet from said loading station to said machining station, and means mounting said wheels on said pallet for vertical movement between lowered and raised positions.

15. Apparatus for transporting a workpiece from a loading station and for locating the workpiece accurately in a machining station, said apparatus comprising a pallet, means on said pallet for clamping the workpiece rigidly to the top of the pallet at said loading station, selectively controllable means for creating a compressed air cushion beneath the pallet to enable vertical floating of the pallet as the latter is moved from said loading station to said machining station, a pallet base in said machining station, means on said pallet base and engageable with said pallet to guide the pallet into said machining station during edgewise approach of the pallet to the machining station, said guide means locating the pallet in an approximate position in a first horizontal direction in said machining station, coacting means on said pallet base and said pallet for holding said pallet against horizontal movement in all directions in said machining station and for locating the pallet in a precise horizontal position in the machining station, said guide means engaging said pallet with clearance to enable shifting of said pallet by said coacting means as the latter locate said pallet in said precise horizontal position, and cooperating means on said pallet base and said pallet for locating the pallet at a precisely predetermined elevation in said machining station after release of said air cushion to lower the pallet.

16. Apparatus as defined in claim 15 in which said guide means comprise rollers upstanding from said pallet base and spaced from one another along the line of approach of the pallet to the pallet base, an elongated channel in the underside of the pallet and extending substantially perpendicular to one edge of the pallet, said channel being defined by upright side walls which embrace said rollers with lateral clearance during edgewise approach of the pallet to the pallet base thereby to guide the pallet into said machining station while enabling further shifting of the pallet to said precise horizontal position by said coacting means.

17. Apparatus as defined in claim 16 in which the ends of said channel are flared outwardly relative to said walls to lead the channel onto said rollers.

18. Apparatus as defined in claim 15, further including stops on said pallet base and engageable with one edge of the pallet to limit edgewise movement of the pallet into said machining station and to locate the pallet in an approximate position in a second and perpendicular horizontal direction in said machining station.

19. Apparatus as defined in claim 18 further including means mounting said stops for yielding in the direction of edgewise approach of the pallet to the machining station and biasing said stops in the opposite direction, said stops yielding upon being engaged initially by said pallet and thereafter rebounding to locate the pallet in its approximate position in said second horizontal direction.

20. Apparatus for transporting a workpiece from a loading station and for locating the workpiece accurately in a machining station, said apparatus comprising a generally rectangular pallet, a downwardly opening guide channel on the underside of the pallet and extending from a first edge of the pallet to a second and opposite edge thereof midway between and parallel to the third and fourth edges of the pallet, means on said pallet for clamping the workpiece rigidly to the top of the pallet at said loading station, selectively controllable means for creating a compressed air cushion beneath the pallet to enable vertical floating of the pallet as the latter is moved from said loading station to said machining station, a pallet base in said machining station, coacting means on said pallet base and said pallet for holding said pallet against horizontal movement in all directions in said machining station and for locating the pallet in a precise horizontal position in the machining station, said coacting means on said pallet comprising a pair of dowel-receiving seats spaced equidistantly from opposite sides of the channel and each centered between said first and second edges, and cooperating means on said pallet base and said pallet for locating the pallet at a precisely predetermined elevation in said machining station after release of said air cushion to lower the pallet, said cooperating means on said pallet comprising four locators depending from the pallet and located at the corners of an imaginary rectangle which is centered relative to the pallet and whose sides parallel the edges of the pallet.

21. Apparatus as defined in claim 20 in which said means for creating said air cushion comprise inflatable air bags formed with holes for emitting jets of compressed air beneath the bags, there being at least one inboard row of air bags located on each side of said channel and inboard of the adjacent pair of locators, and there being at least one outboard row of air bags located outboard of each pair of locators.

22. Apparatus as defined in claim 21 further including a space located between at least two adjacent air bags in each of said outboard rows, said dowel-receiving seats being located within said spaces.

23. In a machine tool organization, the combination of, a machine tool having a head and a slide, said slide being movable toward and away from said head, and apparatus for transporting a workpiece from a loading station and for locating the workpiece accurately relative to said head, said apparatus comprising a pallet, means on said pallet for clamping the workpiece rigidly to the top of the pallet at said loading station, selectively controllable means for creating a compressed air cushion beneath the pallet to enable vertical floating of the pallet as the latter is moved from said loading station to said machine tool, a pallet base on top of the slide of said machine tool, coacting means on said pallet base and said pallet for holding said pallet against horizontal movement in all directions on said slide and for locating the pallet in a precise horizontal position relative to said head, and cooperating means on said pallet base and said pallet for locating the pallet at a precisely predetermined elevation relative to said head after release of said air cushion to lower the pallet.

24. Apparatus as defined in claim 23 in which the upper surface of said pallet base is disposed in the same horizontal plane as the floor surface of a machine shop within which said machine tool is located, said slide being located below said floor surface.

* * * * *